(12) United States Patent
Zacks et al.

(10) Patent No.: US 7,369,100 B2
(45) Date of Patent: May 6, 2008

(54) DISPLAY SYSTEM AND METHOD WITH MULTI-PERSON PRESENTATION FUNCTION

(75) Inventors: Carolyn A. Zacks, Rochester, NY (US); Dan Harel, Rochester, NY (US); Frank Marino, Rochester, NY (US); Karen M. Taxier, Rochester, NY (US); Michael J. Telek, Pittsford, NY (US); Alan L. Wertheimer, Pittsford, NY (US); William C. Archie, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 731 days.

(21) Appl. No.: 10/795,555

(22) Filed: Mar. 4, 2004

(65) Prior Publication Data

US 2005/0195330 A1    Sep. 8, 2005

(51) Int. Cl.
*G09G 5/00* (2006.01)
(52) U.S. Cl. .............................. 345/1.3; 345/2; 345/7; 345/9; 345/169; 345/173
(58) Field of Classification Search ............ 345/1.3, 345/2, 7, 9, 169, 173
See application file for complete search history.

(56) References Cited

U.S. PATENT DOCUMENTS

| | | |
|---|---|---|
| 3,965,592 A | 6/1976 | Anos |
| 4,085,297 A | 4/1978 | Paglia |
| 4,541,188 A | 9/1985 | Sadorus |
| 4,823,908 A | 4/1989 | Tanaka et al. |
| 4,859,994 A | 8/1989 | Zola et al. |
| 5,049,987 A | 9/1991 | Hoppenstein |

(Continued)

FOREIGN PATENT DOCUMENTS

EP    1 241 838 A2    9/2002

(Continued)

OTHER PUBLICATIONS

David Schneider; "In the Audio Spotlight—A Sonar Technique Allows Loudspeakers to Deliver Focused Sound Beams"; Scientific American; Oct. 1998.

(Continued)

*Primary Examiner*—Richard Hjerpe
*Assistant Examiner*—Leonid Shapiro
(74) *Attorney, Agent, or Firm*—Roland R. Schindler

(57) ABSTRACT

Display systems, control systems for a display and a method for operating a display are provided in which people are detected a presentation space within which content presented by the display can be observed. Viewing areas are defined for each person with each viewing area comprising a less than all of the presentation space and including an area corresponding to each person. One channel of image content is obtained for presentation to each person and a combination image is presented on the display. The combination image is modulated so that each area of the combination image presented by the display is viewable only in selected areas of the presentation space. The combination image has image content from each channel of image content arranged in areas of said combination image so that, when modulated, the image content from each channel of image content is viewable only in a viewing area defined for the person for whom the content is obtained.

21 Claims, 18 Drawing Sheets

U.S. PATENT DOCUMENTS

| | | | |
|---|---|---|---|
| 5,164,831 A | 11/1992 | Kuchta et al. | |
| 5,195,135 A | 3/1993 | Palmer | |
| 5,477,264 A | 12/1995 | Sarbadhikari et al. | |
| 5,488,496 A | 1/1996 | Pine | |
| 5,619,219 A | 4/1997 | Coteus et al. | |
| 5,648,789 A | 7/1997 | Beadles et al. | |
| 5,666,215 A | 9/1997 | Fredlund et al. | |
| 5,715,383 A | 2/1998 | Schindler et al. | |
| 5,724,071 A | 3/1998 | Morton et al. | |
| 5,734,425 A | 3/1998 | Takizawa et al. | |
| 5,742,233 A | 4/1998 | Hoffman et al. | |
| 5,760,917 A | 6/1998 | Sheridan | |
| 5,793,341 A * | 8/1998 | Omori et al. | 345/8 |
| 5,810,597 A | 9/1998 | Allen, Jr. et al. | |
| 5,828,402 A | 10/1998 | Collings | |
| 5,828,495 A | 10/1998 | Schindler et al. | |
| 5,900,608 A | 5/1999 | Iida | |
| 5,931,679 A | 8/1999 | Funahashi | |
| 6,004,061 A | 12/1999 | Manico et al. | |
| 6,005,598 A | 12/1999 | Jeong | |
| 6,188,442 B1 | 2/2001 | Narayanaswami | |
| 6,209,787 B1 | 4/2001 | Iida | |
| 6,282,231 B1 | 8/2001 | Norman et al. | |
| 6,282,317 B1 | 8/2001 | Luo et al. | |
| 6,287,252 B1 | 9/2001 | Lugo | |
| 6,294,993 B1 | 9/2001 | Calaman | |
| 6,424,323 B2 * | 7/2002 | Bell et al. | 345/9 |
| 6,438,323 B1 | 8/2002 | DeCecca et al. | |
| 6,471,878 B1 * | 10/2002 | Greene et al. | 216/13 |
| 6,573,888 B2 * | 6/2003 | Hayashi et al. | 345/204 |
| 6,791,519 B2 * | 9/2004 | Aarts et al. | 345/87 |
| 2001/0013131 A1 | 8/2001 | Wang | |
| 2001/0017656 A1 | 8/2001 | Araki et al. | |
| 2002/0019584 A1 | 2/2002 | Schulze et al. | |
| 2002/0076100 A1 | 6/2002 | Luo | |
| 2002/0135618 A1 | 9/2002 | Maes et al. | |
| 2003/0021448 A1 | 1/2003 | Chen et al. | |
| 2005/0137958 A1 * | 6/2005 | Huber et al. | 705/37 |

FOREIGN PATENT DOCUMENTS

| | | | |
|---|---|---|---|
| JP | 62-91926 | | 4/1987 |
| JP | 05-137200 A | * | 6/1993 |
| JP | 10-288958 | | 10/1998 |
| WO | WO 98/02977 | | 1/1998 |
| WO | WO 98/02978 | | 1/1998 |
| WO | WO 99/21186 | | 4/1999 |
| WO | WO 01/26021 | | 4/2001 |
| WO | WO 01/71636 | | 9/2001 |
| WO | WO 02/27640 | | 4/2002 |

OTHER PUBLICATIONS

F. Joseph Pompei; "The Audio Spotlight—Machine Listening Group Digital Life Consortium"; 1999.

Lenny Lipton; "Stereo-Vision Formats for Video and Computer Graphics"; StereoGraphics Corp.; 1996.

"The SynthaGram Handbook"; StereoGraphics Corp.; Feb. 2003; pp. 1-11.

* cited by examiner

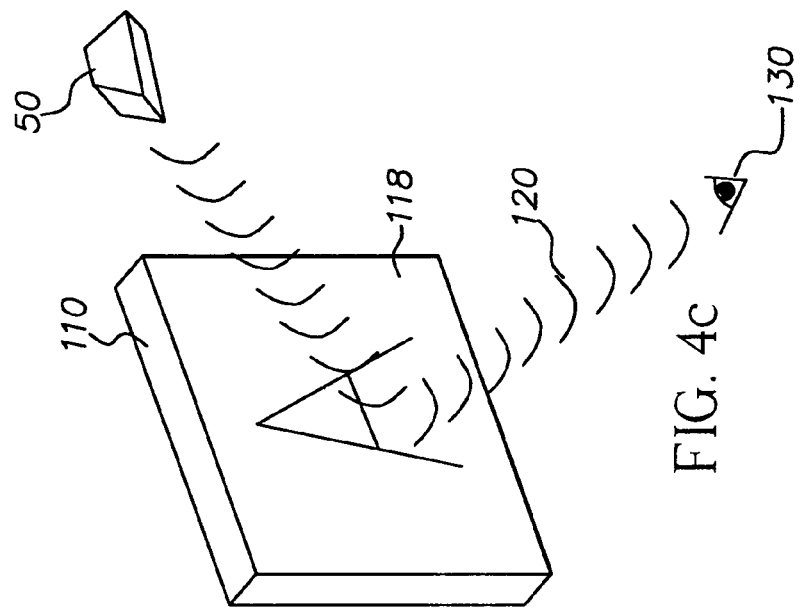
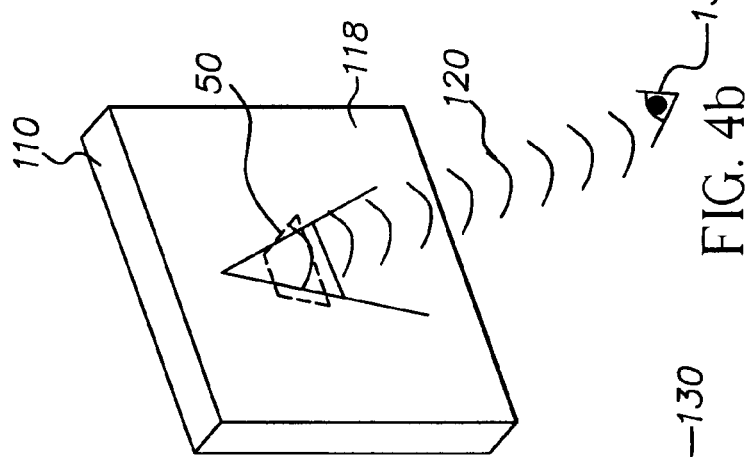
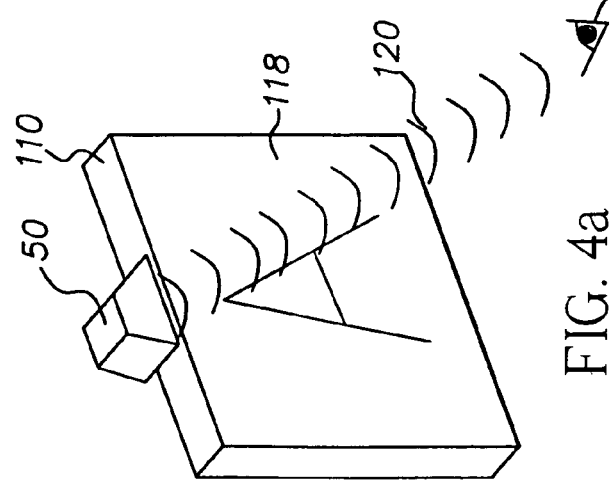
FIG. 4c
FIG. 4b
FIG. 4a

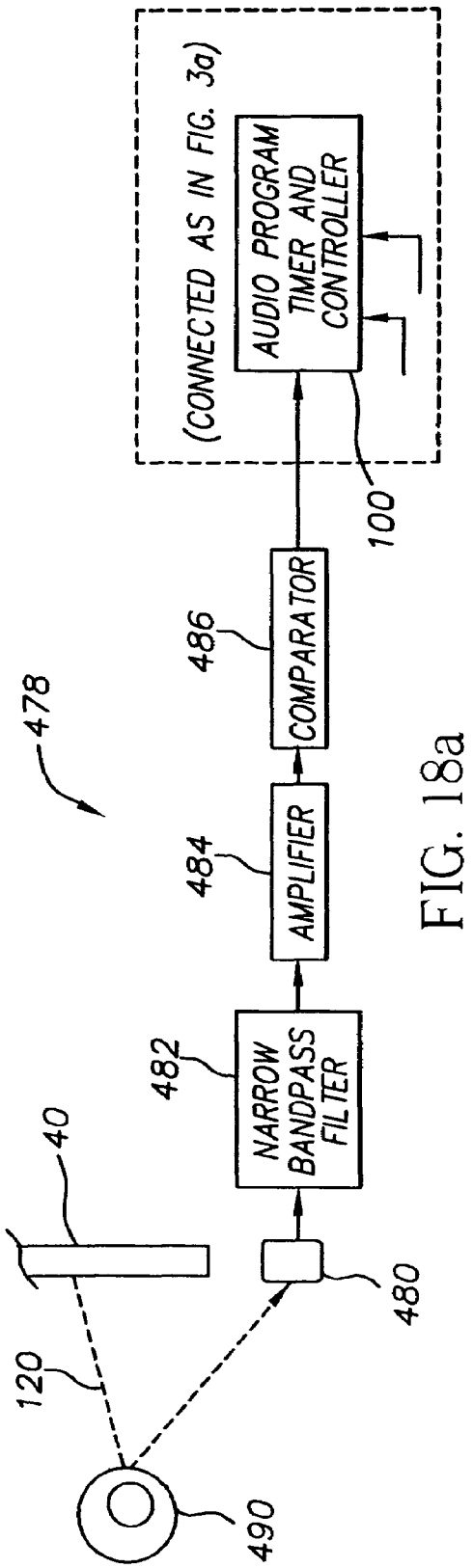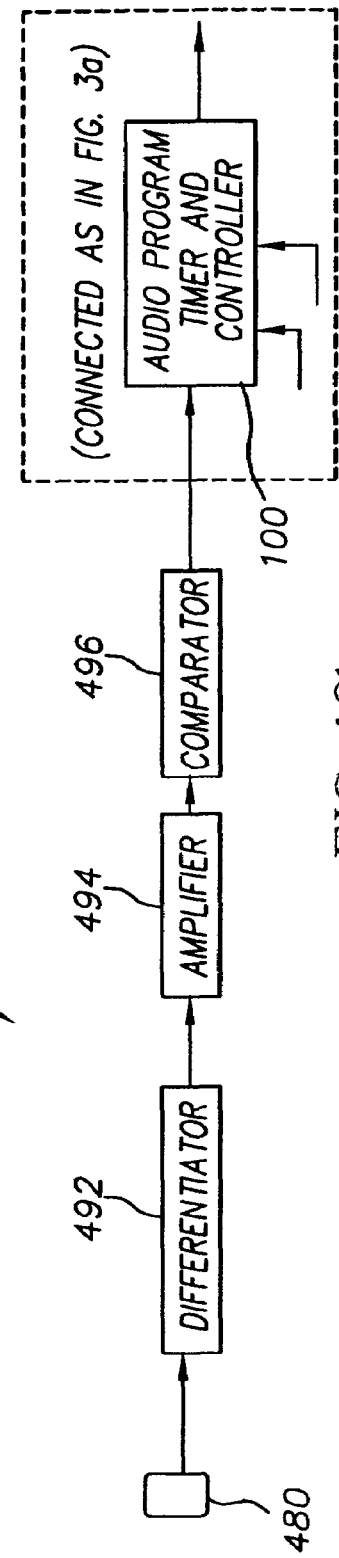
FIG. 18a
FIG. 18b

DISPLAY SYSTEM AND METHOD WITH MULTI-PERSON PRESENTATION FUNCTION

CROSS REFERENCE TO RELATED APPLICATIONS

Reference is made to commonly assigned and co-pending U.S. patent application Ser. No. 09/467,235 entitled PICTORIAL DISPLAY DEVICE WITH DIRECTIONAL AUDIO filed in the name of Agostinelli, et al. on Dec. 20, 1999.

FIELD OF THE INVENTION

This invention relates to the field of pictorial displays and more particularly to the field of audio enhanced pictorial displays.

BACKGROUND OF THE INVENTION

Large-scale video display systems such as rear and front projection television systems, plasma displays, and other types of displays are becoming increasingly popular and affordable. Often such large-scale video display systems are matched with surround sound and other advanced audio systems in order to present audio/visual content in a way that is more immediate and enjoyable for people. Many new homes and offices are even being built with media rooms or amphitheaters designed to accommodate such systems.

Increasingly, such large-scale video displays are also being usefully combined with personal computing systems and other information processing technologies such as internet appliances, digital cable programming, and interactive web based television systems that permit such display systems to be used as part of advanced imaging applications such as videoconferencing, simulations, games, interactive programming, immersive programming and general purpose computing. In many of these applications, the large-scale video display systems are used to present information of a confidential nature such as financial transactions, medical records, and personal communications.

One inherent problem in the use of such large-scale video display systems is that the cost of such a display system is high which means that the typical home or office can only afford one such display. Thus, people who wish to view content presented by such a display must typically agree on the content to be presented on the display. Where the people disagree about what is to be watched, conflicts can occur. Thus, some display devices have been developed that present more than one type of content on the same display. For example, so-called "picture and picture" televisions have existed for some time. These televisions present one channel of content on a first portion of the screen and images from a second channel of content on a second portion of the screen. Typically, the first portion of the screen occupies more than half of the display screen while the second portion occupies on inset portion within the first portion. It will be appreciated that such an arrangement, while useful, has drawbacks. The selection of which channel of content will be presented on the first portion of the display screen can occasion the same conflicts that arise with conventional televisions channel of content. Further, in a usual implementation the second portion appears as an overlay on the first portion blocking portions of the first image. This leads to dissatisfaction with the appearance of images that are presented in the first portion, while the comparatively small size of the second portion leads to dissatisfaction with the appearance of images presented in the second portion.

Thus, what is needed is a presentation system that is capable of presenting different channels of content to different people in a presentation space while also presenting each channel of content in a pleasing or restrictive manner. Preferably, such a presentation system will present such content so that each channel of presented content appears, to an observer, to occupy substantially all of the display without interference from other content. One way to accomplish this effect is to use a display screen and lenticular screen to divide images presented on the display screen so that the display can present content to different zones proximate to the screen. In one system used in a product known as the "SynthaGram™" monitor sold by StereoGraphics Corp. San Rafael, Calif., U.S.A. multiple images are presented to a system of rigidly established viewing zones each defined relative to the display. Within each zone, a viewer appears be able to view the displayed images in depth. The "SynthaGram™" presents the same content to each zone. U.S. Pat. No. 5,049,987, entitled METHOD AND APPARATUS FOR CREATING THREE-DIMENSIONAL TELEVISION OR OTHER MULTI-DIMENSIONAL IMAGES, filed Oct. 11, 1989 by Hoppenstein also describes a system of rigidly established viewing zones and suggests that different content can be presented in each zone.

It will be appreciated that the rigidly defined zones used in the "SynthaGram™" and described in the '987 patent requires that the users position themselves in predefined zones to observe the content. This can be inconvenient and impractical in many home viewing environments.

Thus, what is also needed is a system and a method for presenting multiple channels of content to different people in a presentation space that adapts to the actual positions of the people. What is also needed is a presentation system that is capable of presenting different content to different people in a presentation space in one mode of operation and yet is operable in another mode to present the same content throughout the presentation space.

Even if the need to present different image content to different presentation areas is solved, a solution is also needed for the problem of how to provide different audio signals associated with different content so that each person in the presentation space who hears audio content that is associated with the image content without interference from audio content associated with other image content presented in a presentation space.

It will also be appreciated that the location of people in the presentation space can change during presentation of content. Accordingly, what is needed is a system that detects changes in the location of people within the presentation space and adapts the presentation of content based upon the detected changes.

SUMMARY OF THE INVENTION

In one aspect of the invention, a control system for a display is provided. The control system has a presentation space monitoring system sampling a presentation space within which images presented by the display can be observed, and generating monitoring signals from which the location of people in the presentation space can be determined. An image modulator is positioned between the display and the presentation space. The image modulator is adapted to control the spatial distribution of light emitted by the display so that the light that is emitted by particular portions of the display travels to particular areas in the presentation space. A controller is adapted to determine the location of each person in said presentation space based upon the monitoring signal, and to obtain at least one channel of content for presentation to each located person. The controller is further adapted to cause the display to present a combination image with images from each channel of content obtained for each person arranged in the form of a pattern of light that is spatially distributed by the image modulator to the viewing area determined for that person.

In another aspect of the invention, a display system is provided. The display system has a display capable of presenting separate channels of pictorial content to separable viewing areas and a multi-channel source of changing pictorial content. A source of audio content provides audio signals containing audio content associated with each channel of changing pictorial content. An audio transducer converts audio content into audible signals and an audio driver directs selected audible signals to selected viewing areas. A monitoring system is provided and is adapted to monitor areas in which changing pictorial content can be viewed to locate a people in the monitored areas. A controller is connected to the multi-view display, the source of changing pictorial content, the audio transducer and the acoustic driver. The controller is adapted to cause the multi-view display to display separate channels of image content in separate viewing areas each defined for a person located by the monitoring system and to cause the audio transducer and acoustic driver to separately direct audio content associated with each channel of pictorial content area to that viewing area.

In another aspect of the invention, a multi-view display system is provided. The system has a presentation space monitoring system adapted to evaluate a presentation space proximate to a display and to generate a monitoring signal indicating the location of each person in the presentation space with the display having a source of image modulated light. A lenticular screen is positioned between the source of image modulated light and the presentation space. The lenticular screen has lenses defined to direct light received from selected portions of the display into corresponding areas of the presentation space. A display driver is adapted to receive more than one channel of image content and to use the source of image modulated light to form a pattern of image modulated light that combines channels of image content and that is adapted so that image content from each channel of image content is observable in a different area. An audio content source provides a supply of audio content corresponding to each channel of pictorial content. An audio transducer array with associated audio preprocessing and array driver are provided. The audio transducer array is arranged to project a directed beam of sound from each supply of audio content to a different area of the presentation space. A controller determines the location of each person in the presentation space based upon the monitoring signal determines an individual viewing area for each person in said presentation space selects a channel of image content and corresponding audio content for each person and causes the display driver and audio transducer array to present the channel of image content and corresponding audio content for each person in the viewing area determined for each person.

In a further aspect of the invention, a method for presenting multiple channels of image content using a light emitting display is provided. In accordance with this method, people are detected in a presentation space within which content presented by the display can be observed. Viewing areas are defined for each person with each viewing area comprising a less than all of the presentation space and including an area corresponding to each person. One channel of image content is obtained for presentation to each person and a combination image is presented on the display. The combination image is modulated so that each area of the combination image presented by the display is viewable only in selected areas of the presentation space. The combination image has image content from each channel of image content arranged in areas of said combination image so that, when modulated, the image content from each channel of image content is viewable only in a viewing area defined for the person for whom the content is obtained.

In still another aspect of the invention, a method is provided for presenting multiple channels of image content using a light emitting display. In accordance with the method, people are detected in a presentation space within which, content presented by the display can be observed and different channels of content are selected for the detected people. A separate viewing area is defined for each detected person with each viewing area comprising less than all of the presentation space and including space corresponding to a detected person. An image is formed that comprises a combination of the image content from each different channels content with the combination image incorporating image content from different channels and different areas of the combination image. The combination image is presented in the form of a pattern of image modulated light. The image modulated light is directed so that light from different portions of the display is directed toward different areas of the presentation space. A combination image formed based upon the content selected for each person located in one of the viewing area images is presented in the form of a pattern of image modulated light emitted by the display. The combination image contains image information from each channel of content arranged so that image modulated light formed based upon the content selected for each person will be directed to the viewing area defined for that person.

BRIEF DESCRIPTION OF THE DRAWINGS

FIGS. 4a-c depicts three different embodiments of devices for displaying pictorial content which produces audio messages associated with the pictorial content;

FIGS. 18a-18b are block diagrams of alternative systems to detect the presence of an observer in front of an audio-enhanced display in accordance with another embodiment of the present invention.

DETAILED DESCRIPTION OF THE INVENTION

In various embodiments of the invention, methods and system are provided that enable the presentation of separate video and/or audio content to different users in a presentation space. In certain embodiments, this is enabled by controlling the direction in which video and audio signals generated by the display. FIGS. 1-5 illustrate and explain various methods for providing directional audio within a presentation space. FIGS. 6-19 illustrate and describe systems and methods for providing directional video.

Figure 1:
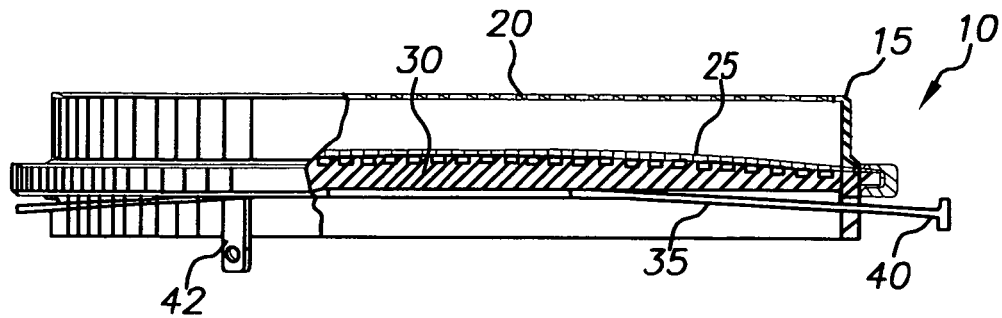
FIG. 1 is an electrostatic ultrasonic transducer which can be used in accordance with some embodiments of the present invention.

Turning first to FIG. 1, an elevational view of a capacitance type electro-acoustical transducer assembly 10 is depicted. Such a transducer is disclosed in detail in U.S. Pat. No. 4,085,297 and is preferred for use in constructing the ultrasound directional audio transducer arrays employed in this invention. Certain details of the construction of the transducer are repeated here for clarity. Among other key components as disclosed in the '297 patent, transducer assembly 10 includes a cylindrical cover 15 of circular cross section and incorporating screened end 20, through which ultrasound is emitted. Diaphragm 25, constructed of relatively thin dielectric material, having electrically conductive vibratile and electrically nonconductive surfaces, is pressed into the open end of cover 15. Diaphragm 25 has its electrically conductive vibratile surface adjacent the screened end 20 of cover 15. Backplate 30, a substantially inflexible, relatively high inertia plate-like member, is of circular cross section, and has a plane surface on one side and has a grooved and curved surface on the opposite side. All of the external surfaces of backplate 30 are electrically conductive and are in an electrically conductive relationship with one another. Backplate 30 is of convex shape in that its center is of greater thickness than its periphery. Spring 35 is an elongated resilient member, and tongue-like end 40 is in the form of an electrical lug to facilitate connection to an external electrical conductor; electrical connection to the cover 15 is provided via lug 42. Spring 35 presses on backplate 30, forcing the backplate 30 into engagement with the nonconductive surface of diaphragm 25 which causes the diaphragm 25 to become correctly tensioned for proper transducer operation.

Figure 2A:
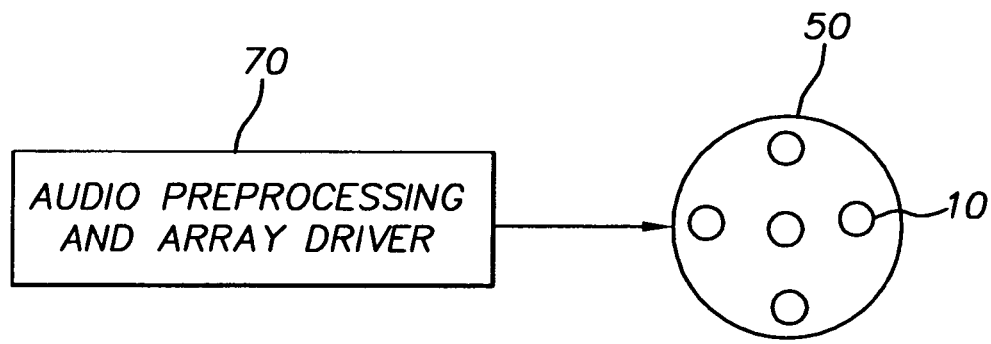
FIGS. 2a and 2b are block diagrams of directional audio transducer arrays of ultrasonic transducers and associated control electronics for use some embodiments of the present invention.

FIG. 2a is a block diagram of a directional audio transducer array 50 and associated driver electronics such as that taught by Frank J. Pompei ("Audio Spotlight—Machine Listening Group Digital Life Consortium" from the internet based publication of the MIT Media Lab; in the Audio Spotlight, Scientific American, October 1998; and the Audio Spotlight, "The Use of Airborne Ultrasonics for Generating Audible Sound Beams", Machine Listening Group, MIT Media Lab. presented at the 105$^{th}$ AES Meeting). Directional array 50 produces highly directional beams of sound and can be located either within, or attached to the display device. Alternatively, directional array 50 is positioned (preferably on the ceiling near the display) to reflect a directional beam of sound off the front surface of a display (e.g. a glass plate covering the image). Also in this latter alternative, the beam of sound could be steered either mechanically or via a phased array so that a single transducer array can be used to provide a directional beam of sound to multiple areas proximate to the display. Alternatively, multiple directional transducer arrays, suitably directed, could be employed for this purpose.

Directional audio transducer array 50 in FIG. 2a is made up of the electrostatic ultrasound transducers 10 (FIG. 1) as disclosed in the above-cited Pompei MIT publications. Also as taught by Pompei, because of the non-linear nature of the creation of audible sound by interaction of ultrasonic beams in air, the audible sound will be characterized by severe distortion unless the audio signal driving the array is pre-processed to compensate for the nonlinear characteristics of the interaction which creates the audible sound. This audio preprocessing is performed by audio preprocessing and array driver 70. See Pompei infra.

Figure 2B:
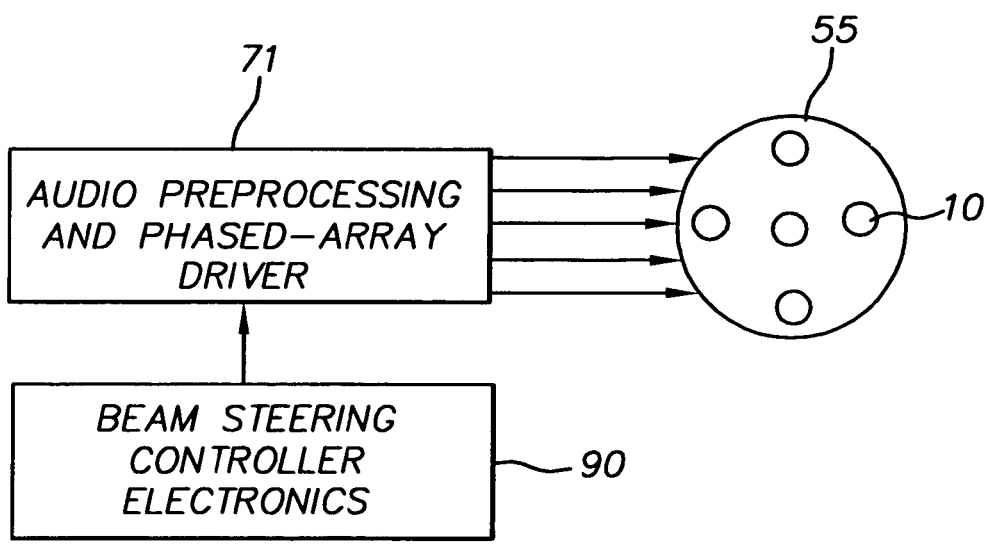

FIG. 2b shows a block diagram of a transducer array and associated electronics for use with embodiments where it is important to direct a beam of sound generated by the directional audio transducer array 50 in more than one direction, for example within a range of positions relative to a pictorial display device. In this embodiment, beam steering controller electronics 90 are additionally employed to drive a phased array directional audio transducer 55 to direct the beam of sound as needed. In phased array operation, each electro-acoustical transducer 10, is driven individually with a phase difference introduced in the drive signal for each transducer. By appropriate choice of phase difference, it is possible to direct the overall ultrasonic beam emitted from the array in a desired direction. It is also possible to produce multiple beams. It is by virtue of constructive and destructive interference between beams from individual ultrasound transducers 10 that beam steering can be achieved in a phased array as is well known.

Figure 3A:
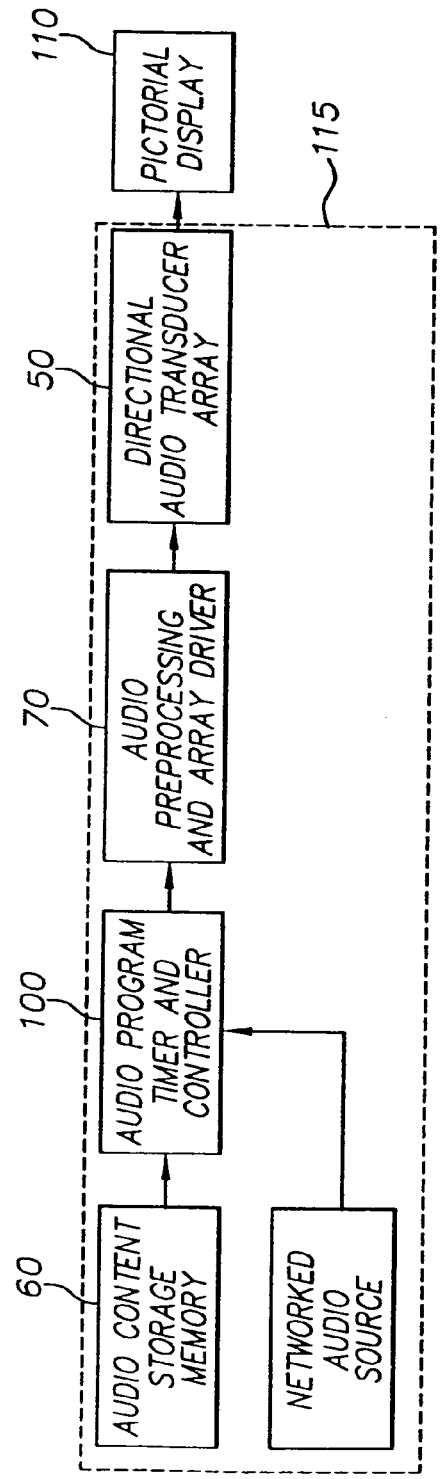
FIGS. 3a-c are block diagrams of alternative audio subsystems for pictorial display devices.

FIG. 3a shows a block diagram of one embodiment of an audio subsystem 115 designed to operate in association with a single pictorial display 110. Audio information is supplied to the audio preprocessing and array driver 70 from an audio content storage memory 60 such as an audio tape cassette drive or solid-state storage memory card. The audio content storage memory 60 stores messages associated with the pictorial content. The pictorial content can include photographs, graphics, text, and the like, as well as combinations of these. Alternatively, audio content can be supplied to the audio preprocessing and array driver 70 via a networked audio source 80 which is connected either by wires or wirelessly to a central source of audio information (not shown) for use with pictorial display 110. Audio preprocessing and array driver 70 pre-processes the audio signal as described above for FIGS. 2a-b and in turn drives directional audio transducer array 50 with the appropriate ultrasonic drive signal, such that a narrowly directed beam of ultrasound is created. The ultrasonic beam, by interaction with the air, creates a directional audible beam of sound carrying the audio message as taught by Pompei (ibid.). The audio program timer and controller 100 selects the appropriate audio segment and timing of the delivery of the segment to audio preprocessing and array driver 70. Whenever the pictorial or textual content of the pictorial display 110 is changed, the audio content can also be changed, for example by swapping audio cassette tapes, by downloading new content to solid state memory, or swapping removable solid state memory devices, directing new material over a network, or the like.

Figure 3B:
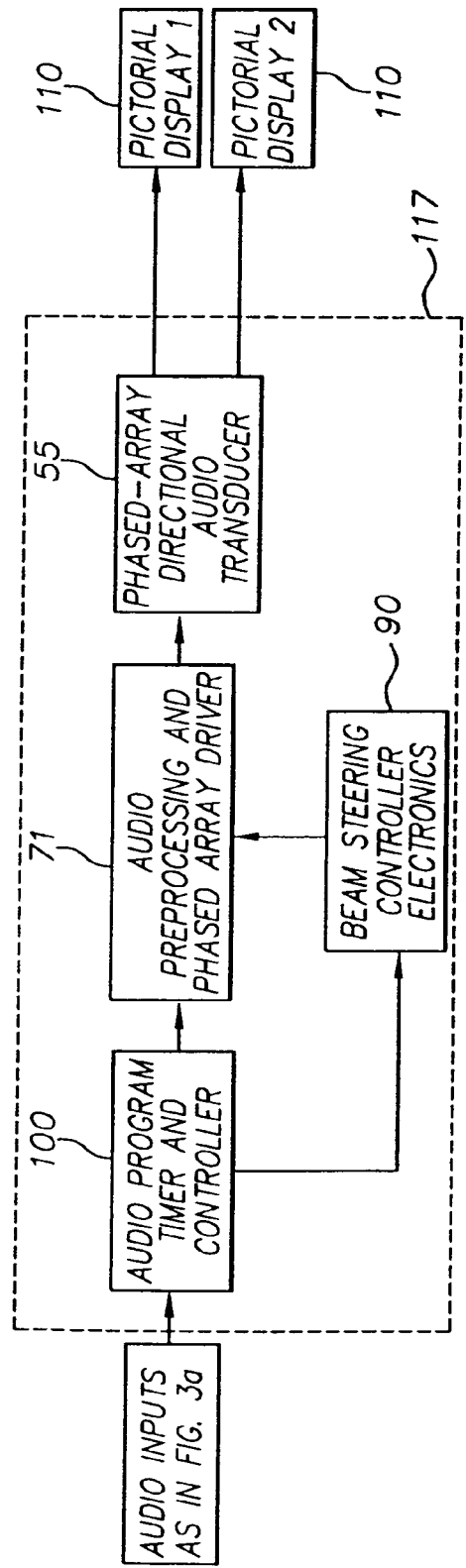

FIG. 3*b* shows a block diagram of an audio subsystem 117 for use with certain embodiments. This embodiment allows a single audio subsystem 117 to provide directionally controlled audio to more than one area proximate to a display system 110. When such a phased array is used, beam steering controller 90 acts to adjust the phase of the signals sent to portions of the array, thereby to steer the beam of sound as needed and direct it to the appropriate viewing position for the view. In audio subsystem 117 audio preprocessing and phased-array driver 71 is connected to the phased-array directional audio transducer 55 only, but the audio program timer and controller 100 is connected to both the audio preprocessing and phased-array driver 71 and to beam steering controller 90.

Figure 3C:
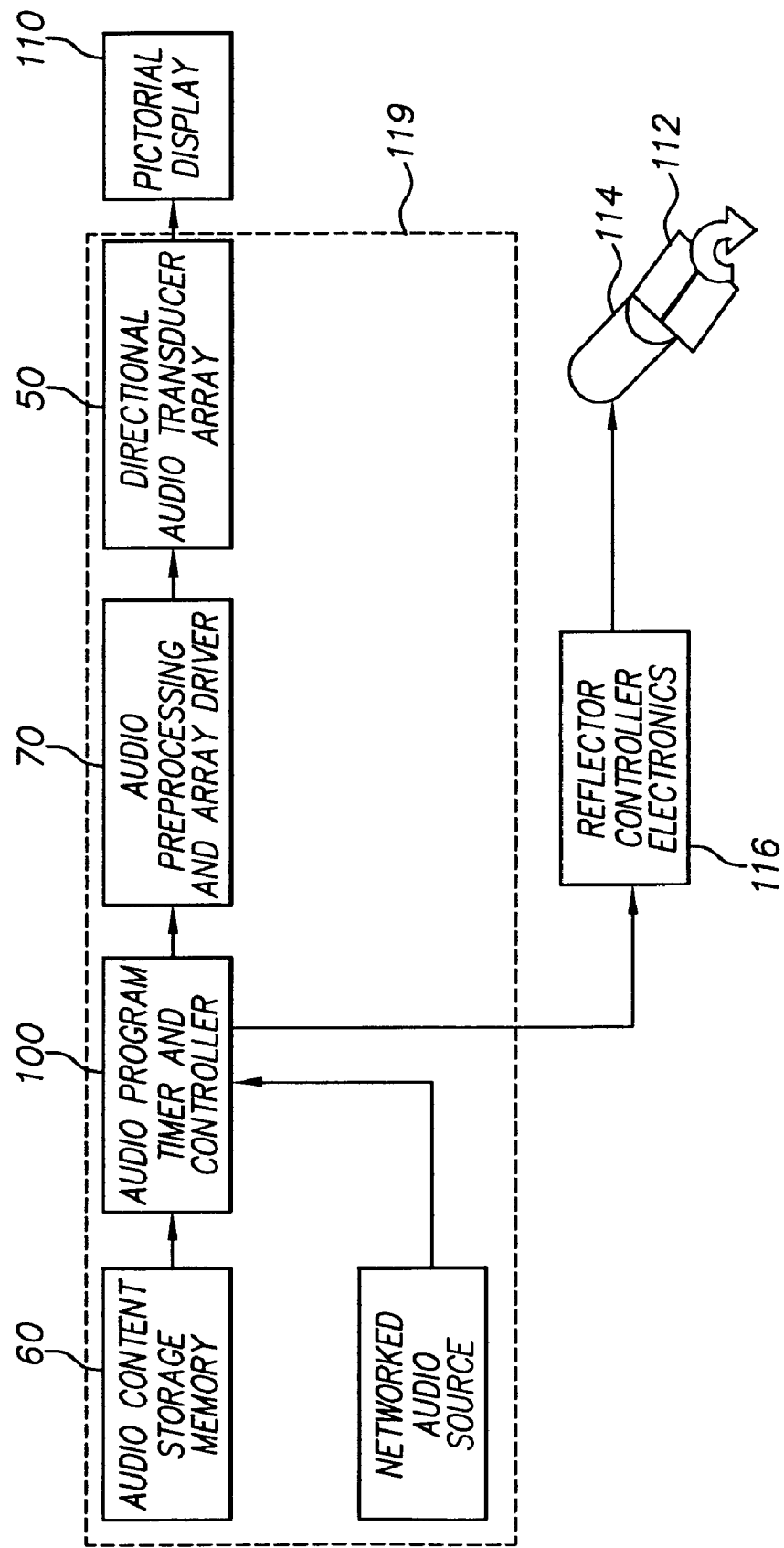

FIG. 3*c* shows a block diagram of another embodiment of an audio subsystem 119 incorporating a selectably rotatable reflector 112 and associated electronics 116 needed for its operation. The rotatable reflector 112 can be any suitable material which specularly reflects an ultrasonic beam, such as a smooth flat metal plate. In FIG. 3*c*, rotatable reflector 112 is moved by motor 114 which is in turn driven by reflector controller electronics 116 and is rotated to reflect the beam of sound from the directional audio transducer array 50 to the appropriate viewing position as shown in FIG. 7*c*. The reflector controller electronics 116 are also connected to the audio program timer and controller 100; otherwise the audio subsystem for this embodiment is identical to that shown in FIG. 3*a*.

FIGS. 4*a*-*c* illustrate several embodiments of the general operation of audio subsystem of a pictorial display 110. The pictorial display 110 will be described in greater detail below, however, for the purposes of FIGS. 4*a*-4*c*, pictorial display 110 is shown as having a display surface 118 from which image modulated light emerges. FIG. 4*a* shows the pictorial display 110 with directional audio transducer array 50 mounted centrally on top of the pictorial display 110. From the directional audio transducer array 50, a beam of sound 120 is directed to viewing position 130 in front of the pictorial display 110. In FIG. 4*b*, the directional audio transducer array 50 is mounted inside or behind display surface 118 of pictorial display 110 so that beam of sound 120 again is directed to viewing position 130 and appears to emanate from the pictorial display 110 itself. In FIG. 4*c* the directional audio transducer array 50 is separately mounted (e.g. on the ceiling in front of the pictorial display 110) so that beam of sound 120 is directed first to the display surface 118 of pictorial display 110 and reflects toward viewing position 130. Thus with all these configurations, an observer at viewing position 130 is able to both see the pictorial display 110 and receive the audio message content associated with the pictorial content of the pictorial display 110.

Figure 5:
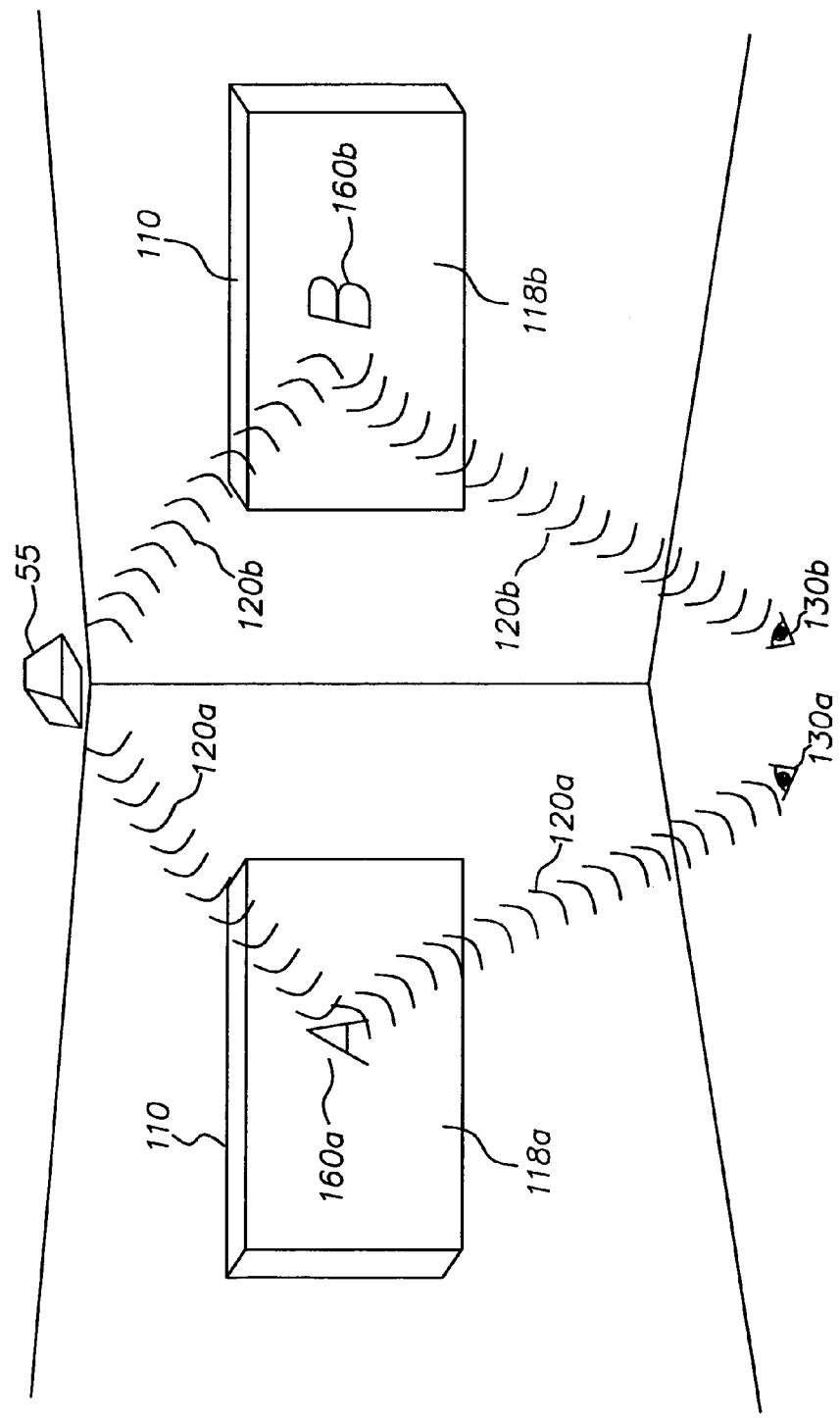
FIG. 5 depicts an embodiment wherein two display devices served by the same directional audio transducer array.

In FIG. 5 a single phased-array directional audio transducer 55 serves two pictorial displays 110 each carrying different images "A" 160*a* and "B" 160*b* which can be text. Beam steering controller 90 (not shown) through action of the audio preprocessing and phased-array driver 70 driving the phased-array directional audio transducer 55 directs beams of sound 120*a* and 120*b*. Audio beams 120*a* and 120*b* carry separate audio segments appropriate to the two different images 160*a* and 160*b* respectively with which they are associated and, after reflecting off the front surface 118*a* and 118*b* of pictorial display 110, are directed to viewing positions 130*a* and 130*b*. It will be appreciated that this embodiment could be easily extended to include more than two separate displays with associated audio segments and to provide more than one channel of audio content at each display so that viewers of each display can observe different content.

Figure 6:
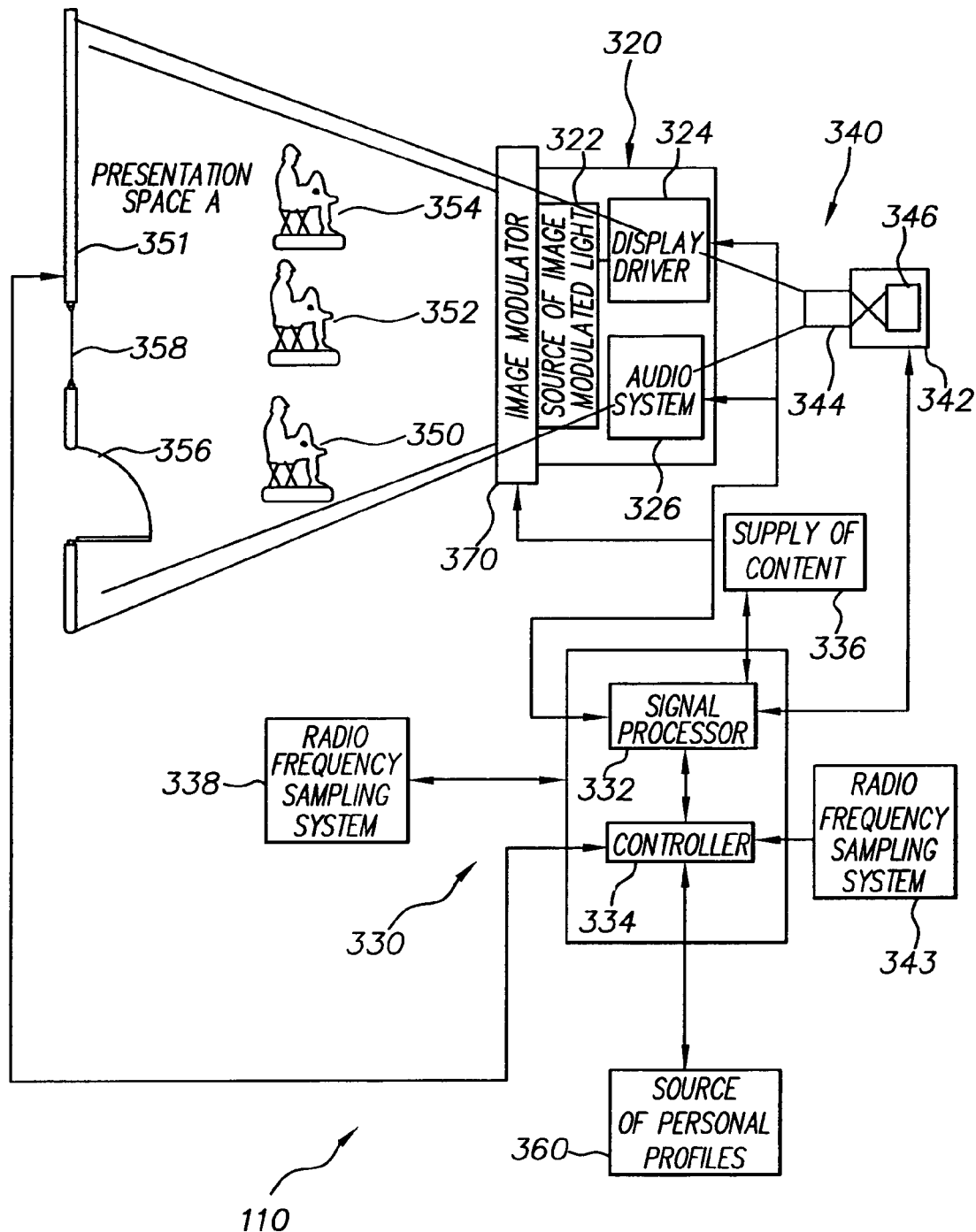
FIG. 6 shows a block diagram of one embodiment of a display system of the present invention.

FIG. 6 shows an embodiment of display system 110. In the embodiment shown in FIG. 6, display system 110 comprises a display 320 such as an analog television, a digital television, computer monitor, projection system or other apparatus capable of receiving signals containing images or other visual content and converting the signals into an image that can be observed or otherwise discerned by a person in a presentation space A. As used herein, the term content refers to any form of video, audio, text, affective or graphic information or representations and any combination thereof. Display 320 comprises a source of image modulated light 322 such as a cathode ray tube, a liquid crystal display, a plasma display, an organic light emitting display, an organic electroluminescent display, a cholesteric or other bi-stable type display or other type of display element. Alternatively, the source of image modulated light 322 can comprise any other form of front or rear projection display system known in the art. A display driver 324 is also provided. Display driver 324 receives image signals and converts these image signals into signals that cause the source of image modulated light 322 to display an image.

Display system 110 also comprises an audio system 326. In the embodiment shown, audio system 326 comprises a directional audio transducer system such as directional audio transducer array 50 and/or phased array audio transducer 55 described above. Appropriate control and driving circuits and systems also described above can also be provided. Said circuits and systems include but are not limited to audio content storage memory 60, audio preprocessing and array driver 70, audio preprocessing and phased-array driver 71, beam steering controller 90, and/or audio program timer and controller 100. Audio system 326 can comprise one directed transducer or multiple transducers and/or arrays of such transducers as described above.

Audio system 326 is operable in one of two modes, a first mode wherein audio signals are directed to individual or closely positioned groups of viewers in presentation space A and a second mode wherein audio signals are provided so that they are detectable throughout the presentation space.

Audio system 326 can comprise other forms of audio systems such as conventional monaural, stereo, or surround sound systems to provide audio to all of presentation space. A when audio system 326 is operated in the second mode. Alternatively, audio system 326 can comprise a conventional audio system fitted with personal listening devices (not shown) such as headphones and earphones that can be used to provide separate audio signals to separate users when audio system 326 is operated in the first mode. Such personal listening devices can be connected to audio system 326 using wires or using wireless communication systems.

Display system 110 also incorporates a control system 330. Control system 330 comprises a signal processor 332, a controller 334, a presentation space monitoring system 340, and an image modulator 370. A supply of content 336 provides more than one channel of content bearing signals to signal processor 332. Supply of content 336 can comprise for example a digital videodisc player, videocassette player, a computer, a digital or analog video or still camera, scanner, cable television network, the Internet or other telecommunications system, an electronic memory or other electronic system capable of conveying a signal containing content for presentation or combinations thereof. As used herein, the term "channel" is broadly used to indicate any form of audio content that can be viewed separately from other image or audio content.

Signal processor 332 receives this content and adapts the content for presentation. As will be discussed in greater detail below, signal processor 332 extracts video content from selected channels of content and generates signals that cause the source of image modulated light 322 to display a combination image incorporating image content from more than one channel so that image modulator 370 will direct image content from one channel into one area and image content from another channel to another area of presentation space A. Similarly, signal processor 332 extracts audio signals from the more than one channel of content bearing signals. The extracted audio signals are provided to audio system 326 which converts the audio signals into an audible form that can be heard in presentation space A.

Controller 334 selectively causes image content received by signal processor 332 to be presented by the source of image modulated light 322. In the embodiment shown in FIG. 6, a user interface 338 is provided to permit local control over various features of display system 110. User interface 338 can comprise any form of transducer or other device capable of receiving an input from a user and converting this input into a form that can be used by controller 334 in operating display system 110. For example, user interface 338 can comprise a touch screen input, a touch pad input, a 4-way switch, a 5-way switch, a 6-way switch, an 8-way switch, or any other multi-way switch structure, a stylus system, a trackball system, a joystick system, a voice recognition system, a gesture recognition system or other such systems. User interface 338 can be fixedly incorporated into display system 10 and alternatively some or all of the portions of user interface 338 can be separable from display system 10 so as to provide a remote control (not shown).

User interface 338 can include an activation button (not shown) that sends a trigger signal to controller 332 indicating a desire to present content as well as other controls useful in the operation of the display 320. For example, user interface 338 can be adapted to allow one or more people to enter system adjustment preferences such as hue, contrast, brightness, audio volume, content channel selections etc. Controller 334 receives signals from user interface 338 that characterize the adjustments requested by the user and will provide appropriate instructions to signal processor 332 to cause images presented by display device 320 and that will be observed by that person take on the requested system adjustments.

Similarly, user interface 338 can be adapted to allow a user of display system 110 to enter inputs to enable or disable display system 110 and/or to select particular channels of content for presentation. User interface 338 can provide other inputs for use in calibration, and operation as will be described in greater detail below. For example, user interface 338 can be adapted with a voice recognition module that recognizes audible speech and/or or commands and provides voice recognition to convert such speech and/or commands into signals that can be used by controller 334 to control operation of display system 110.

A presentation space monitoring system 340 is also provided to sample presentation space A and, optionally, spaces adjacent to presentation space A and to provide sampling signals from which signal processor 332 and/or controller 334 can detect people in presentation space A and/or people approaching presentation space A. As is noted above, presentation space A will comprise any space or area in which the content presented by the display system 110 can be viewed, observed perceived or otherwise discerned. Presentation space A can take many forms and can be dependent upon the environment in which display system 110 is operated and the image presentation capabilities of display system 110. For example, in the embodiment shown in FIG. 6, presentation space A is defined in part as the space between display 320 and wall 351 because wall 351 blocks light emitted by the source of image modulated light 322. Because wall 351 has door 356 and window 358 through which content presented by display system 110 can be observed, presentation space A can include areas beyond wall 351 that are proximate to these.

Alternatively, where display system 110 is operated in an open space such as a display area in a retail store, a train station or an airport terminal, presentation space A will be limited by the optical display capabilities of display system 110. Similarly where display system 110 is operated in a mobile environment, presentation space A can change as display system 110 is moved.

In the embodiment shown in FIG. 6, presentation space monitoring system 340 comprises a conventional image capture device such as an analog or digital image capture unit 342 comprising a taking lens unit 344 that focuses light from a scene onto an image sensor 346 that converts the light into electronic signal. Taking lens unit 344 and image sensor 346 cooperate to capture sampling images that include presentation space A. In this embodiment, the sampling signal comprises at least one sampling image. The sampling signal is supplied to signal processor 332 which analyzes sampling signal to determine the location of people in and/or near presentation space A. In certain embodiments, controller 334 can also be used to analyze the sampling signal.

Figure 7:
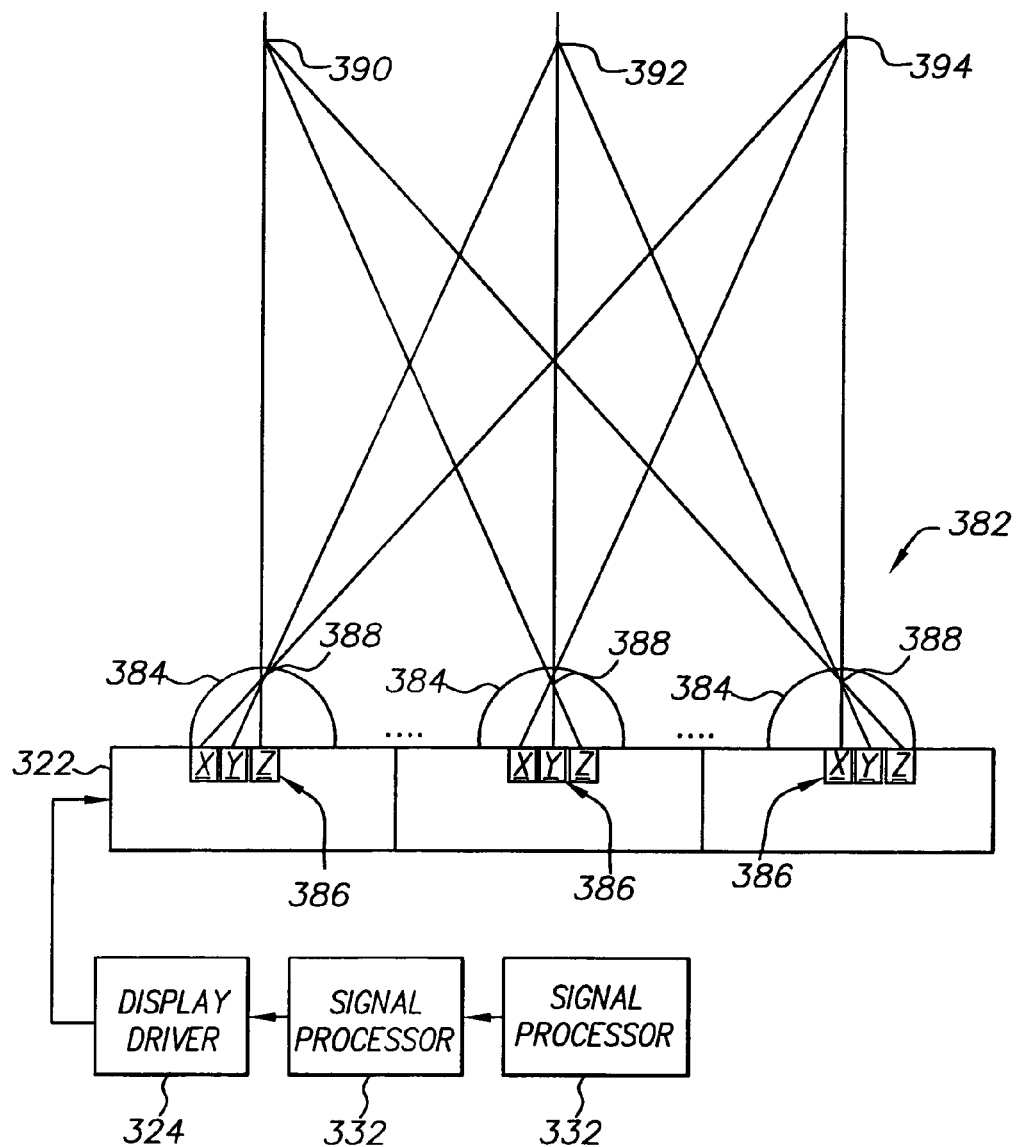
FIG. 7 shows an illustration of the operation of one embodiment of an image modulator.

FIGS. 6-8 show image modulator 370 positioned between source of image modulated light 322 and people 350, 352, and 354. Image modulator 370 receives light images from source of image modulated light 322 and directs light from the portions of images formed on selected portions of the source of image modulated light 322 to corresponding viewing areas such as viewing area 372. As shown in FIG. 10, viewing area 372 includes less than all of presentation space A but also includes a location proximate to person 352.

Figure 8A:
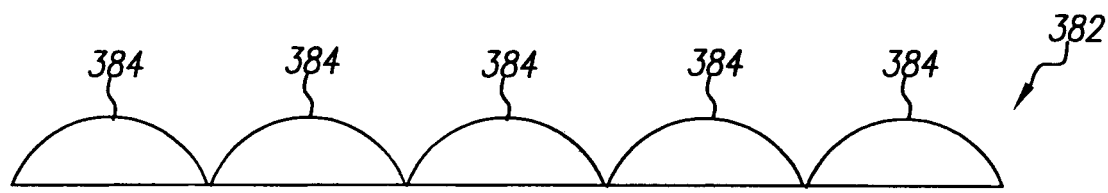
FIGS. 8a-8c illustrate various embodiments of an array of micro-lenses.
Figure 8B:
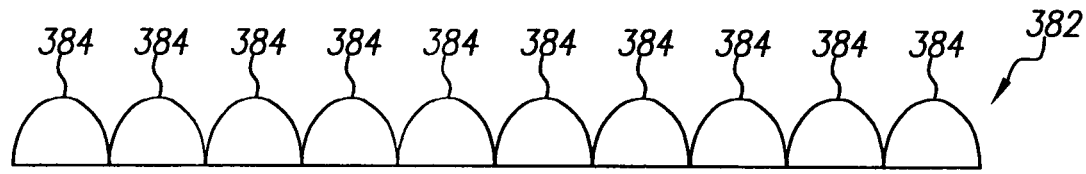
Figure 8C:
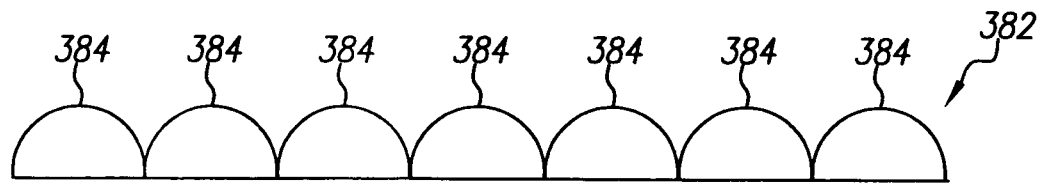

Image modulator 370 can take many forms. FIG. 7 illustrates a cross section view of one embodiment of image modulator 370 comprising an array 382 of micro-lenses 384. The array 382 of micro-lenses 384 can be arranged for cooperation with source of image modulated light 322, display driver 324, signal processor 332 and/or controller 334 in a variety of areas, some of which will be described in greater detail below. Array 382 of micro-lenses 384 can take one of many forms. For example, as is shown in FIGS. 8a and 8b, array 382 can comprise hemi-aspherical micro-lenses 386 or as shown in FIG. 8c array 382 can comprise hemi-spherical micro-lenses 386. However, the diagrams equally represent in cross-section hemi-cylindrical or hemi-acylindrical micro-lenses 384. Array 382 can also include micro-lenses 384 but are not limited to spherical, cylindrical, aspherical, or acylindrical micro-lenses 384.

FIG. 7 shows a source of image modulated light 322 having an array of controllable image elements 386, each capable of providing variable levels of light output and array 382 of micro-lenses 384 arranged in concert therewith. In certain embodiments, the source of image modulated light 322 and array 382 of micro-lenses 384 can be integrally formed using a common substrate. This helps to ensure that image elements 386 of source of image modulated light 322 are aligned with each micro-lens 384 of array 382. In other embodiments, the source of image modulated light 322 and the array 382 of micro-lenses 384 can be separate but joined in an aligned relationship.

In the embodiment illustrated in FIG. 7, each micro-lens 384 is aligned in concert with image elements 386 in groups designated as X, Y and Z. In operation, signal processor 332 can cause source of image modulated light 322 to present images using only image elements 386 of group X, only image elements 386 associated with group B, only image elements 386 associated with group C or any combination thereof. Light emitted by or passing through each picture element 386 passes through an optical axis 388 of each associated micro-lens 384. Accordingly, as is also shown in FIG. 7, when an image is presented using only image elements of group X, an observer located at position 394 will be able to observe the image while an observer standing at one of positions 390 and 392 will not be able to observe the image. Similarly, when an image is presented using only image elements 386 of group Y an observer located at position 392 will be able to observe the content while an observer standing at one of positions 390 or 394 will not be able to observe the content. Further, when an image is presented using only image elements 386 of group Z an observer located at position 390 will be able to observe the content while an observer standing at one of positions 392 or 394 will not be able to observe the content.

Thus, by using an image modulator 370 with a co-designed signal processor 332 and controller 334 it is possible to operate display system 320 in a manner that causes images presented by source of image modulated light 322 to be directed so that they reach only viewing space 372 within presentation space A. As more groups of separately controllable image elements 386 are interposed behind each micro-lens 384, it becomes possible define more than three viewing areas in presentation space A. For example, twenty or more groups of image elements can be defined in association with a particular micro-lens to divide the presentation space A into twenty portions or more portions so that content presented using display system 10 can be limited to an area that is at most $\frac{1}{100}^{th}$ of the overall presentation space A.

Figure 9:
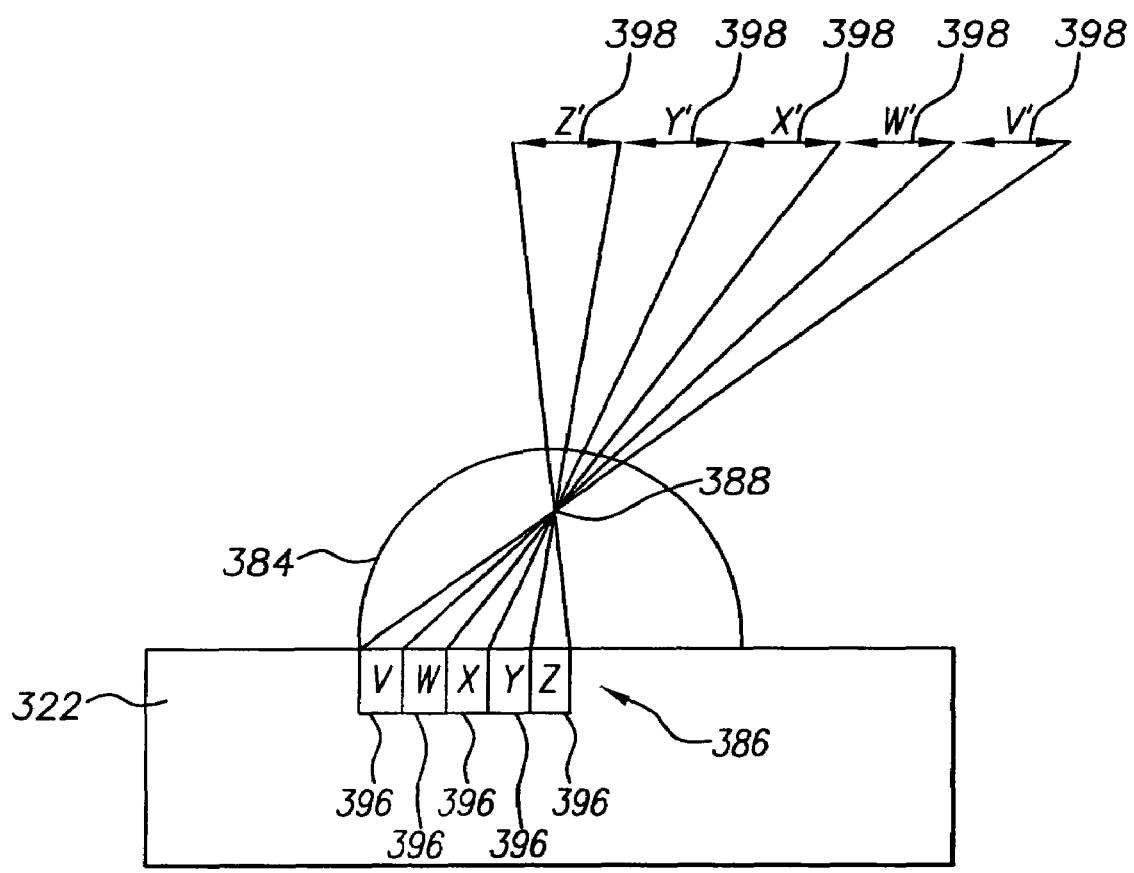
FIG. 9 illustrates ranges of viewing areas that can be defined using groups of image elements having particular widths.

However, other arrangements are possible. For example, groups of image elements 386 such as groups X, Y and Z can comprise individual image elements 386 or multiple image elements 386. As is shown in FIG. 9, source of image modulated light 322 has groups V, W, X, Y and Z, and each group has a width 396 that defines, in part, a range of viewing positions 398 at which content presented using the image elements 386 of the group can be observed. The width 396 and displacement of a group relative to the relative to the position of optical axis 388 of an associated micro-lens 372 determines the location and overall width of an associated range 398. In one embodiment of the present invention, each micro-lens 384 is arranged proximate to an array of image elements 386 with display driver 324 and/or image processor 332 programmed to adaptively select individual image elements 386 for use in forming images. In such an embodiment, both the width 396 and the displacement of the group of image elements 386 relative to the optical axis 388 of each micro-lens 384 can be adjusted to adaptively define the range 398 and position of the viewing area 372 in a way that dynamically tracks the movements of a person 352 within presentation space A.

Thus, using this embodiment of image modulator 370 it is possible to present content in a way that is discernable only at a particular position or range of positions relative to the source of image modulated light 322. This position can be defined vertically or horizontally with respect to the source of image modulated light 322 and/or image modulator 170. For example, array 382 can comprise an array of hemi-cylindrical micro-lenses 384 arranged with the optical axis 388 arranged vertically, horizontally or diagonally so that viewing areas can be defined horizontally, vertically or along both axes. Similarly an array 382 of hemi-spherical micro-lenses can be arranged with imaging elements 386 defined with relation thereto so that viewing spaces can be defined having two degrees of restriction. Three degrees of restriction can be provided where a depth 376 of viewings space 372 is controlled as will be described in greater detail below.

Figure 10C:
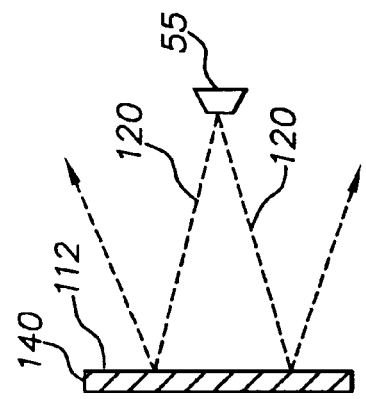
FIGS. 10a-10f depict alternative embodiments of a lenticular multi-view display device with associated directional audio transducer arrays.
Figure 10F:
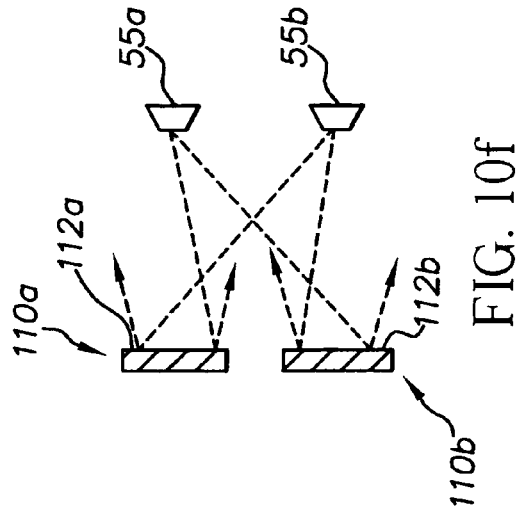
Figure 10B:
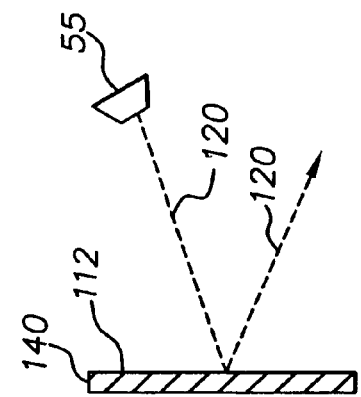
Figure 10E:
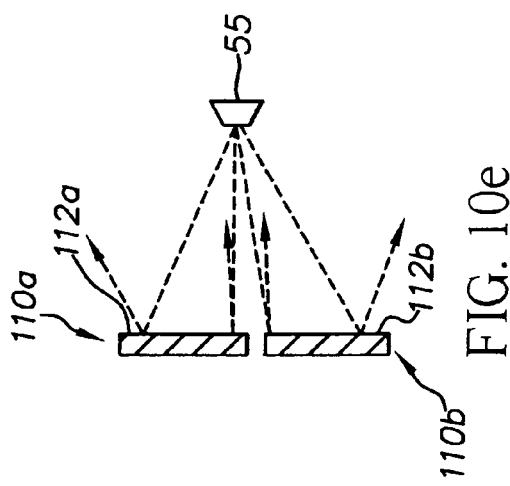
Figure 10A:
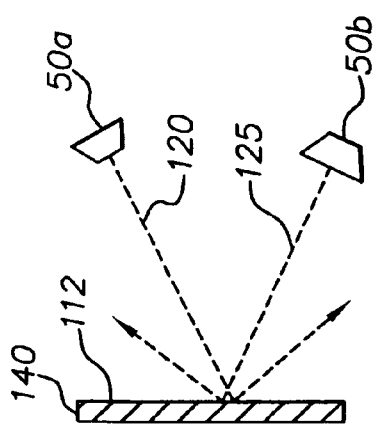

FIGS. 10a-10f depicts additional embodiments of display device 110 with associated audio content presented therewith. FIG. 10a shows a top view of a multi-view of a pictorial display 110 where two directional audio transducer arrays 50a and 50b direct beams of sound 120 and 125 to reflect off of the surface 112 of the display device 110 at angles corresponding to the viewing positions of two viewing areas. FIG. 10b shows both side and top views of the multi-view lenticular display 140 where the phased-array directional audio transducer 55 sends the beam of sound 120 to either one or the other of the viewing positions of the multi-view lenticular display 140. The beam steering controller 90, audio preprocessing and phased-array driver 71, and audio program timer and controller 100 (not shown here, see FIG. 3b) directs the correct audio message appropriate to the correct viewing position of the multi-view lenticular display 140. In FIG. 10c, a selectably rotatable reflector 470 is used to steer the beam of sound 120 emanating from a directional audio transducer array 50 at angles appropriate to the two viewing positions of multi-view lenticular display 140.

Figure 10D:
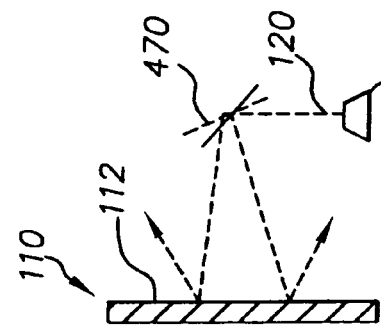

FIGS. 10d and 10e show installations where two pictorial displays 110a and 110b are mounted close together. In FIG. 10d, one phased-array directional audio transducer 55 serves both pictorial displays 110a and 110b. FIG. 10e shows an instance where two pictorial displays 110a and 110b are served by phased-array directional audio transducer 55 and FIG. 10f shows an instance where two pictorial displays 110a and 110b are served by two phased-array directional audio transducers 55a and 55b.

Again it will be appreciated that the embodiments shown in FIGS. 10a and 10f serve to illustrate typical embodiments where a pictorial display 110 is enhanced with directed audio to support two viewing areas per display, but that the concept could be easily extended to include displays where more than two viewing areas are available or where multiple viewing areas with depth are included. It will also be appreciated that, in such embodiments, each view and its corresponding audio are perceptible within viewing areas that can be dynamically defined based upon the location of people in space A presentation area.

In an alternative mode of operation, controller 332 can cause the display device 110 to present a composite image that incorporates the same image at groups V, W, X, Y, and Z. In this way, presented image can be made to appear continuously across ranges V', W', X' Y' and Z' so that display system 110 appears to be presented in a conventional manner. Thus, display system 110 can be made operable in both a conventional presentation mode and in a mode that limits the presentation of content to one or more viewing spaces.

Figure 11:
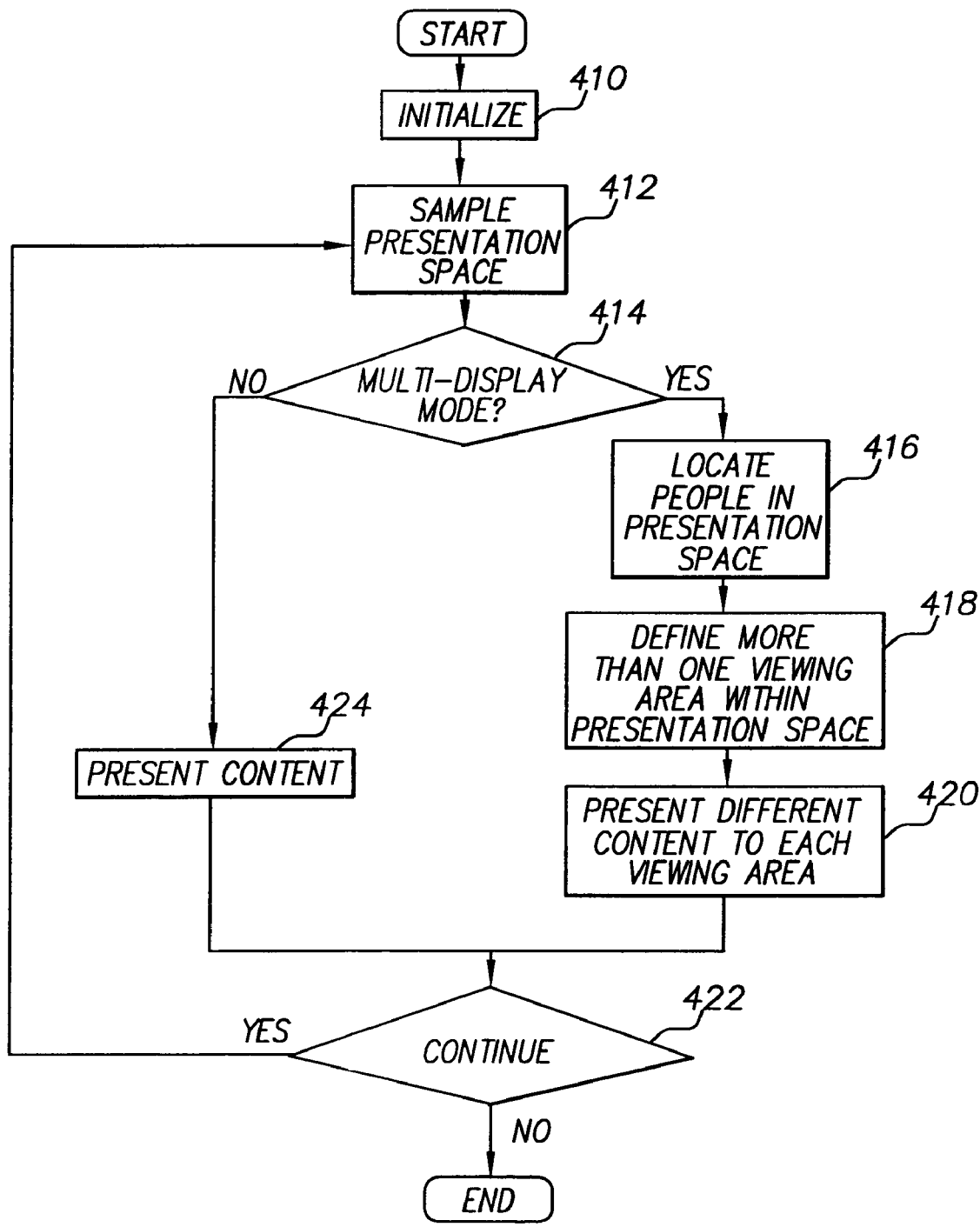
FIG. 11 is a flow diagram of one embodiment of a method of the present invention.

FIG. 11 shows a flow diagram of another embodiment of a method for operating a display system 110 having an image modulator 370. In a first step of the method, operation of display system 110 is initiated (step 410). This can be done in response to a command issued by a person in the presentation space A, typically made using user interface 338. Alternatively, this can be done automatically in response to preprogrammed preferences and/or by using presentation space monitoring system 340 to monitor presentation space A and to cooperate with signal processor 332 and controller 334 to determine when to operate display system 110 based upon analysis of a sampling signal provided by monitoring system 340. Other methods for initiating operation of display system 110 can be used.

Controller 334 causes presentation space monitoring system 340 to sample presentation space A (step 412). In the embodiment of FIG. 11, this is done by capturing an image or multiple images of presentation space A and, optionally, areas adjacent to presentation space A using image capture unit 342. These images are optionally processed, and provided to signal processor 332 and/or controller 334 as a sampling signal.

Controller 334 makes a determination as to whether different content is to be presented to different portions of the presentation space (step 414). This determination can be made in a number of ways. In one embodiment, user input system 338 can be used to provide instructions to controller 334 indicating that different content is to be presented to different portions of presentation space A.

In another embodiment, controller 334 and/or signal processor 332 can analyze the sampling signal, identify people in the presentation space and determine profile information for each person, and determine whether different content is to be presented to different portions of presentation space A using the profile information for each person. In still another embodiment, the determination as to whether different content should be presented to different portions of the presentation space can be made, in part, based upon the content itself, so that certain forms of content are always presented in different portions of presentation space A.

Where controller 332 determines that different content is to be presented to different portions of the presentation space, the sampling signal is processed to locate the people in presentation space A (step 416). Because, in this embodiment, the sampling signal is based upon images of presentation space A, people are located in presentation space A by use of image analysis, which can be performed by signal processor 334.

There are various ways in which people can be located by analysis of an image captured of presentation space A. For example, presentation space monitoring system 340 can comprise an image sensor 342 that is capable of capturing images that include image content obtained from light that is in the infra-red spectrum. People can be identified in presentation space A by examining images of presentation space A captured by to detect heat signatures that can be associated with people. For example, the sampling image can be analyzed to detect, for example oval shaped objects having a temperature range between 95 degrees Fahrenheit and 103 degrees Fahrenheit. This allows for ready discrimination between people, pets and other background in the image information contained in the sampling signal.

In still another alternative embodiment, people can be located in the presentation space by using image analysis algorithms such as those disclosed in commonly assigned U.S. patent Publication No. 2002/0076100 entitled "Image Processing Method for Detecting Human Figures in a Digital Image" filed by Lou on Dec. 14, 2000. Alternatively, people can be more specifically identified by classification. For example, the size, shape or other general appearance of people can be used to separate adults people from younger people in presentation space A. This distinction can be used to identify content to be presented to particular portions of presentation space A and for other purposes as will be described herein below.

Face detection algorithms such as those described in commonly assigned U.S. patent Publication No. 2003/0021448 entitled "Method for Detecting Eye and Mouth Positions in a Digital Image" filed by Chen et al. on May 1, 2001, can be used to locate human faces in the presentation space. Once that faces are identified in presentation space A, well known face recognition algorithms can be applied to selectively to identify particular persons in presentation space A. This too can be used to further refine what is presented using display system 110 as will be described in greater detail below.

When more than one person has been located in presentation space A, at least one viewing area 372 comprising less than all of the presentation space and including the location of the person is determined for each person (step 418). Each viewing area 372 includes an area proximate to the person with the viewing area 372 being defined such that a person positioned in that area can observe the content.

Figure 12:
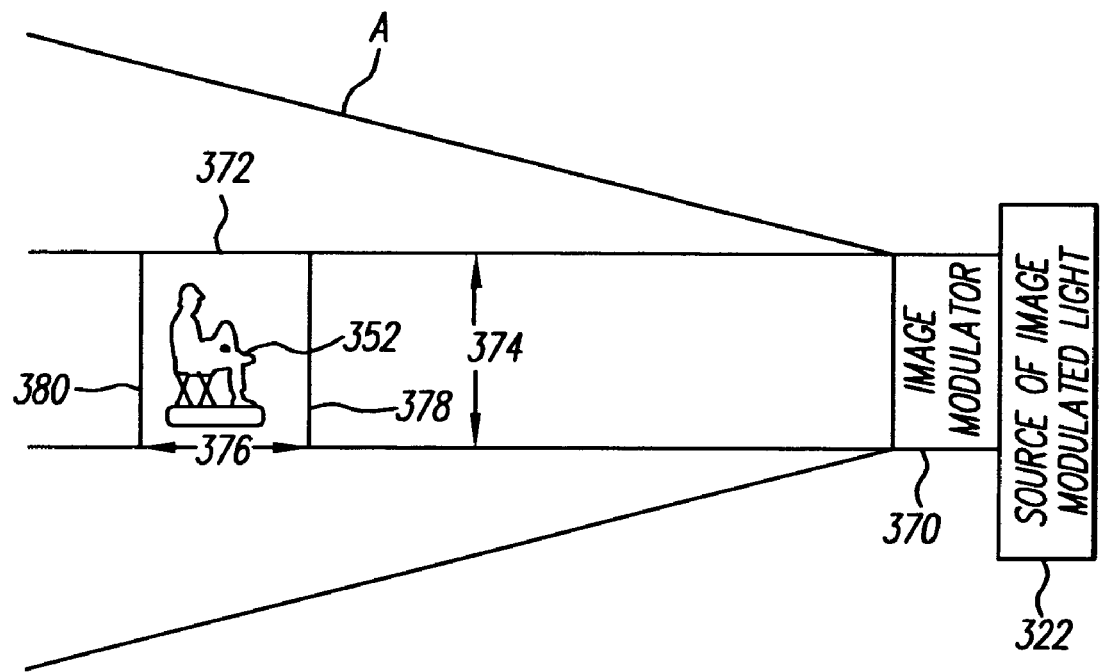
FIG. 12 shows an illustration of a presentation space having a viewing space therein.

The extent to which viewing area 372 expands around the location of person 352 can vary. For example, as is shown in FIG. 12, the viewing area 372 can be defined in terms of an area having, generally a width 374 and a depth 376. As described above the width 374 of viewing area 372 can be defined using image modulator 370 of FIG. 9 by defining the width 396 of a group of image elements 386 which, as described with reference to FIG. 7, causes a concomitant adjustment in the width 374 of the range 398 in which an image presented by a group of image elements 386 can be observed.

The width 374 of viewing area 372 can be defined in accordance with various criteria. For example width 374 can be defined at a width that is no less than the eye separation of eyes of person 352 in viewing area 372. Such an arrangement significantly limits the possibility that persons other than those for whom the content is displayed will be able to observe or otherwise discern the content.

Alternatively, width 374 of viewing area 372 can be defined in part based upon a shoulder width of person 352. In such an alternative embodiment viewing space 372 is defined to be limited to the actual shoulder width or based upon an assumed shoulder width. Such an arrangement permits normal movement of the head of person 352 without impairing the ability of person 352 to observe the content presented on display system 110. This shoulder width arrangement also meaningfully limits the possibility that persons other than the person or persons for whom the content is displayed will be able to see the content as it is unlikely that such persons will have access to such a space. In still other alternative embodiments other widths can be used for the viewing space and other criteria can be applied for presenting the content.

Viewing area 372 can also be defined in terms of a viewing depth 376 or a range of distances from source of image modulated light 322 at which the content presented by display device 10 can be viewed. In certain embodiments, depth 376 can be defined, at least in part, by at least one of a near viewing distance 378 comprising a minimum separation from source of image modulated light 322 at which person 352 located in viewing area 372 can discern the presented content and a far viewing distance 380 comprising a maximum distance from source of image modulated light 322 at which person 352 can discern content presented to viewing area 372. In one embodiment, depth 376 of viewing area 372 can extend from source of image modulated light 322 to infinity. In another embodiment, depth 376 of viewing area 372 can be restricted to a minimum amount of space sufficient to allow person 352 to move her head within a range of normal head movement while in a stationary position without interrupting the presentation of content. Other convenient ranges can be used with a more narrow depth 376 and/or more broad depth 376 being used.

Depth 376 of viewing area 372 can be controlled in various ways. For example, content presented by the source of image modulated light 322 and image modulator 370 is viewable within a depth of focus relative to the image modulator 370. This depth of focus is provided in one embodiment by the focus distance of the micro-lenses 384 of array 382. In another embodiment, image modulator 370 can comprise a focusing lens system (not shown) such as an arrangement of optical lens elements of the type used for focusing conventionally presented images. Such a focusing lens system can be adjustable within a range of focus distances to define a depth of focus in the presentation space that is intended to correspond with a desired depth 378.

Alternatively, it will be appreciated that light propagating from each adjacent micro-lens 374 expands as it propagates and, at a point at a distance from display device 320, the light from one group of display elements 386 combines with light from another group of display elements 386. This combination can make it difficult to discern what is being presented by any one group of image elements. In one embodiment, depth 376 of viewing area 372 can be defined to have a far viewing distance 380 that is defined as a point wherein the content presented by one or more groups of image elements 386 becomes difficult to discern because of interference from content presented by other groups. Signal processor 332 and controller 334 can intentionally define groups of image elements 386 that are intended to interfere with the ability of a person standing in presentation space A who is outside of the viewing area 372 to observe content presented to viewing area 372. Using such techniques, a viewing area can be defined for each person in a presentation space that defines a narrow range of positions, so that people can observe different content on the display without interference.

Controller 332 and/or signal processor 334 cause a combination image to be presented by a source of image modulated light 332 with content being incorporated into the combination image so that the presented content is observable or otherwise discernable only within the viewing areas within presentation space A (step 418). This can be done as shown and described above by selectively directing the formation of image modulated light into portions of the presentation space A. In this way, the image modulated light is only observable within a selected viewing area such as viewing area 372. To help limit the ability of a person to observe the content presented to viewing area 372, alternative images can be presented to areas that are adjacent to viewing area 372. The other content can interfere with the ability of a person to observe the content presented in viewing area 372 and thus reduce the range of positions at which content presented to viewing area 372 can be observed or otherwise discerned.

For example, as shown in FIG. 9, content is presented to a viewing space X' associated with a group of image elements X however, adjacent image elements W and Y present conflict that makes it difficult to discern content that is displayed to viewing space X'. This helps to ensure that only people within viewing space X can discern the content presented to viewing space X'. Where more than one person is in presentation space A more than one viewing space can be defined within presentation space A. Alternatively, a combined viewing space can be defined to include more than one person. Where controller 334 determines not to present different content to different viewing spaces, controller 334 causes common content to be presented to the entire presentation space A (step 424).

It is also appreciated that a person 352 can move relative to display system 110 during presentation of content. Accordingly, while the presentation of content continues, presentation space monitoring system 340 continues to sample presentation space A to detect a location of each person for which a viewing space is defined (step 422). When it is determined that a person such as person 352 has moved relative to the source of image modulated light 322, controller 32 and/or signal processor 34 form a combination image for presentation by source of image modulated light 322 that positions content to be presented to person 352 so that it is observable in a viewing space that is located based upon the current location of person 352 (steps 412-420).

Figure 13:
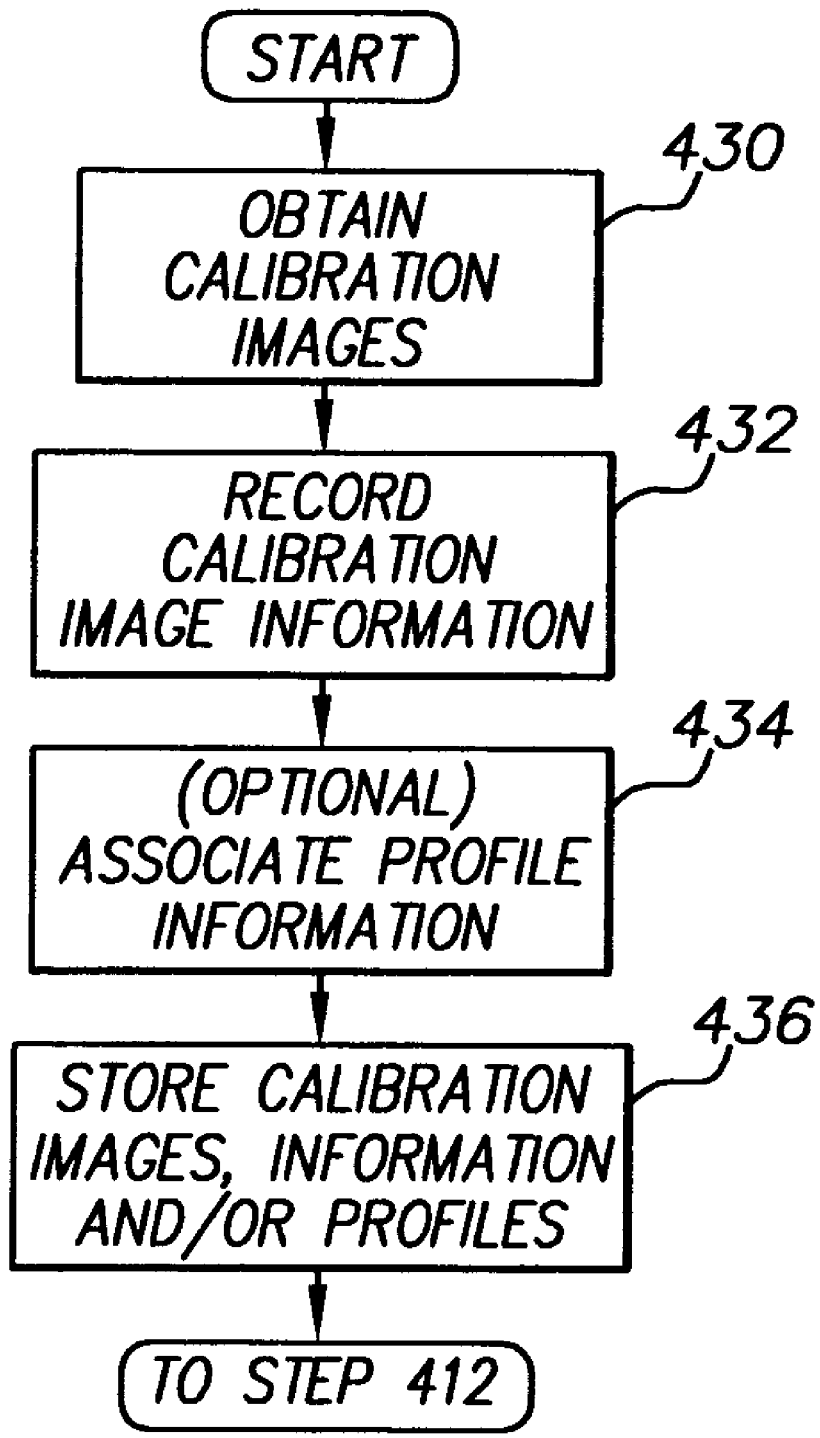
FIG. 13 is a flow diagram of an optional calibration process.

The process of locating people in presentation space A (step 416) can be assisted by use of an optional calibration process. FIG. 13 shows one embodiment of such a calibration process. This embodiment can be performed before content is to be presented using display system 110 or afterward. As is shown in FIG. 13, during calibration, image capture unit 342 can be used to capture at least one calibration image of presentation space A (step 430). The calibration image or images can be obtained at a time where no people are located in presentation space A. Where calibration images have been obtained, alternate embodiments of the step of locating people in presentation space A (step 416) can comprise determining that people are located in areas of the control image that do not have an appearance that corresponds to a corresponding portion of the calibration image.

Optionally, a user of display system 110 can use user interface 338 to record information in association with the calibration image or images to designate areas that are not likely to contain people (step 432). This designation can be used to modify the calibration image either by cropping the calibration image or by inserting metadata into the calibration image or images indicating that portions of the calibration image or images are not to be searched for people. In this way, various portions of presentation space A imaged by image capture unit 342 that are expected to change during display of the content but wherein the changes are not frequently considered to be relevant to a determination of the privileges associated with the content can be identified. For example, a large grandfather clock (not shown) could be present in presentation space A. The clock has turning hands on its face and a moving pendulum. Accordingly where images are captured of the clock over a period of time, changes will occur in the appearance of the clock. However, these changes are not relevant to a determination of the viewing space. Thus, these areas are identified portions of these images that are expected to change over time and signal processor 332 and controller 334 can ignore differences in the appearance of these areas of presentation space A.

Optionally, as shown in FIG. 13, calibration images can be captured of individual people who are likely to be found in the presentation space (step 430). Such calibration images can, for example, be used to provide information that face recognition algorithms described above can use to enhance the accuracy and reliability of the recognition process. Further, the people for whom calibration images are obtained can be identified and the identification information can be recorded. (step 432). The identification information can be used to obtain profile information for such people with the identification information being used for purposes that will be described in greater detail below. Such profile information can be associated with the identification manually or automatically during calibration (step 434). The calibration image or images, any information associated therewith, and the profile information are then stored (step 436). Although the calibration process has been described as a manual calibration process, the calibration process can also be performed in an automatic mode by scanning a presentation space to search for predefined classes of people and for predefined classes of users.

Returning now to FIG. 11, it will be seen that as presentation space monitoring system 340 continues to sample presentation space A during presentation of content, signal processor 332 and/or controller 334 can detect the entry of additional people into presentation space A (step 422). When this occurs, signal processor 332 and/or controller 334 can cooperate to select an appropriate course of action based upon the detected entry of the person into presentation space A. In one course of action, controller 334 can be adapted so that it will not present content to additional people who enter presentation space A until authorized. The authorization can be made manually by an authorized person in presentation space A, such as person 352, can make such authorization by way of making an appropriate action that is detectable by user interface 338. Alternatively, signal processor 332 and/or controller 334 can automatically determine whether such persons are authorized to observe any content, to determine content for presentation to authorized persons and to determine viewing areas for such authorized persons.

In the embodiment of FIG. 13, profiles for individual people or classes of people can be provided by an optional source of personal profiles 360. The source of personal profiles 360 can be a memory device such as an optical, magnetic or electronic storage device or a storage device provided by the remote network. The source of personal profiles 360 can also comprise an algorithm for execution by a processor such as image processor 332 or controller 334. Such an algorithm determines profile information for people detected in presentation space A based upon analysis of the sampling signal. These assigned profiles can be used to help select and control the display of image information as will now be described in greater detail.

Each personal profile identifies the nature of the content that a person in presentation space A is entitled to observe. In one embodiment, people located in presentation space A are located and a personal profile is determined by identifying the located people and obtaining personal profile information for each located person from the source of personal profile information For example, where it is determined that the person is an adult, the viewing privileges for that person may be broader than the viewing privileges associated with a person who is determined to be a child. In another example, particular adults may have access to selected information that is not available to other adults.

The profile can assign viewing privileges in a variety of ways. For example, viewing privileges can be defined with reference to ratings such as those provided by the Motion Picture Association of America (MPAA), Encino, Calif., U.S.A. which rates motion pictures and assigns general ratings to each motion picture. This system can be usefully employed in a process of defining viewing privileges for each detected person. For example, a profile for each person can be is associated with one or more ratings that define a threshold rating for content that the person is entitled to observe. In some embodiments, the viewing privileges of one person can be determined based upon the presence of another person in presentation space A. For example, a child can have a standard set of viewing privileges that are increased where a parent is located in presentation space A.

Such a profile can be assigned without individually identifying the person. This is done by classifying people such as people 350, 352 and 354 and assigning a common set of privileges to each class of detected person. For example, as noted above, people in presentation space A can be classified as adults and children with the profile for adults being associated an R rating. In this example, the R rating permits a generally broad set of viewing privileges. In the same example, the profile for a child can be associated with a G rating permitting a generally narrow set of viewing privileges. Software and algorithms for classifying the age and gender of unknown persons can be used to aid in determining classifications for use in assigning profiles.

It may be useful, in some embodiments, to define a set of privilege conditions for presentation space A to be applied when unknown people are present in presentation space A. An unknown profile can be used to define privilege settings where an unknown person is detected in presentation space A.

The profile information for a person can evolve and change over time. For example, an administrator for the system can change or adapt a profile as desired. Alternatively, controller 32 can be adapted to make changes in a users profile automatically, such as when a person reaches a particular age or meets some other previously unmet criteria.

Figure 14:
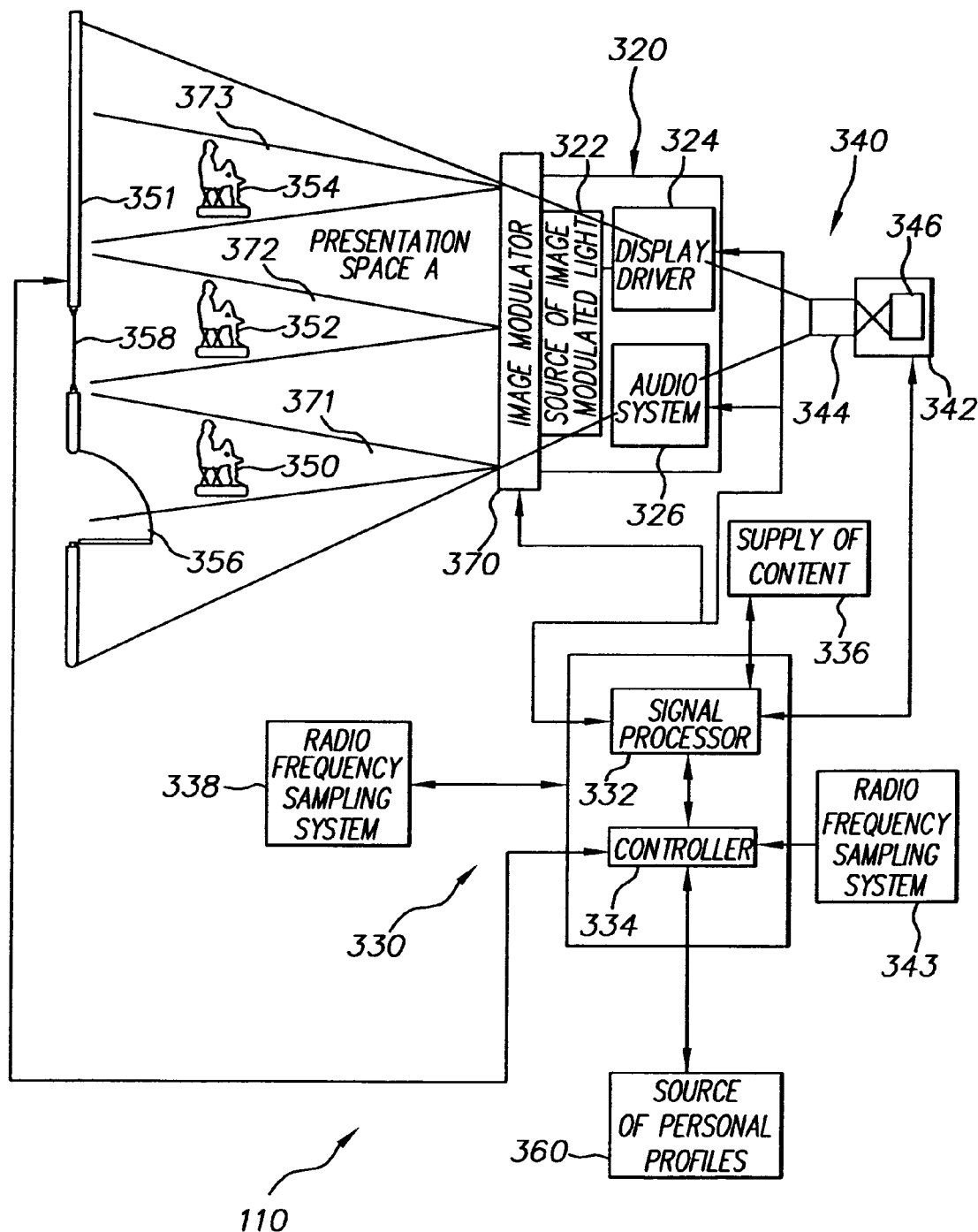
FIG. 14 shows a block diagram of another embodiment of a display system of the present invention.
Figure 15:
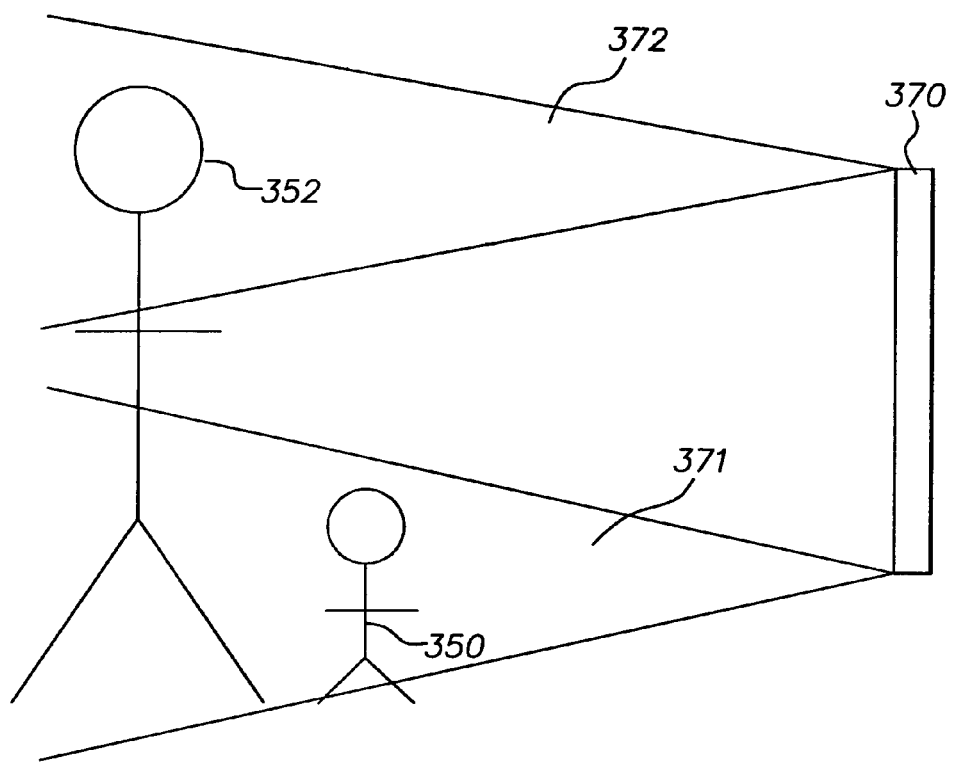
FIG. 15 is an illustration of one application of the present invention in a height-based viewing area.

FIG. 14 illustrates one example of what occurs when controller 334 determines that different content is to be presented to different portions of the presentation space A, viewing area 371, viewing area 372, and viewing area 373 are determined based on the location of person 350, person 352, and person 354 found in presentation space A. Display device 320 then presents the specific channels of content to each person 350, 352, and 354, via viewing area 371, 372, and 373, respectively.

As noted above, one alternative method of dividing the presentation space A could be to divide presentation space A vertically according to the viewing height of each of the people in the presentation space A (FIG. 15), such as parent and child. If the presentation space monitoring system 340 determines that there is more than one person in the presentation space A, and the control system 330 determines that different content is to be presented to different portions of the presentation space A, based on the height of the people in the presentation space A, the viewing area 371 and viewing area 372 are calculated based on the height of person 350 and person 352, respectively. Content specific to each person is then presented via presentation system 330.

Figure 16:
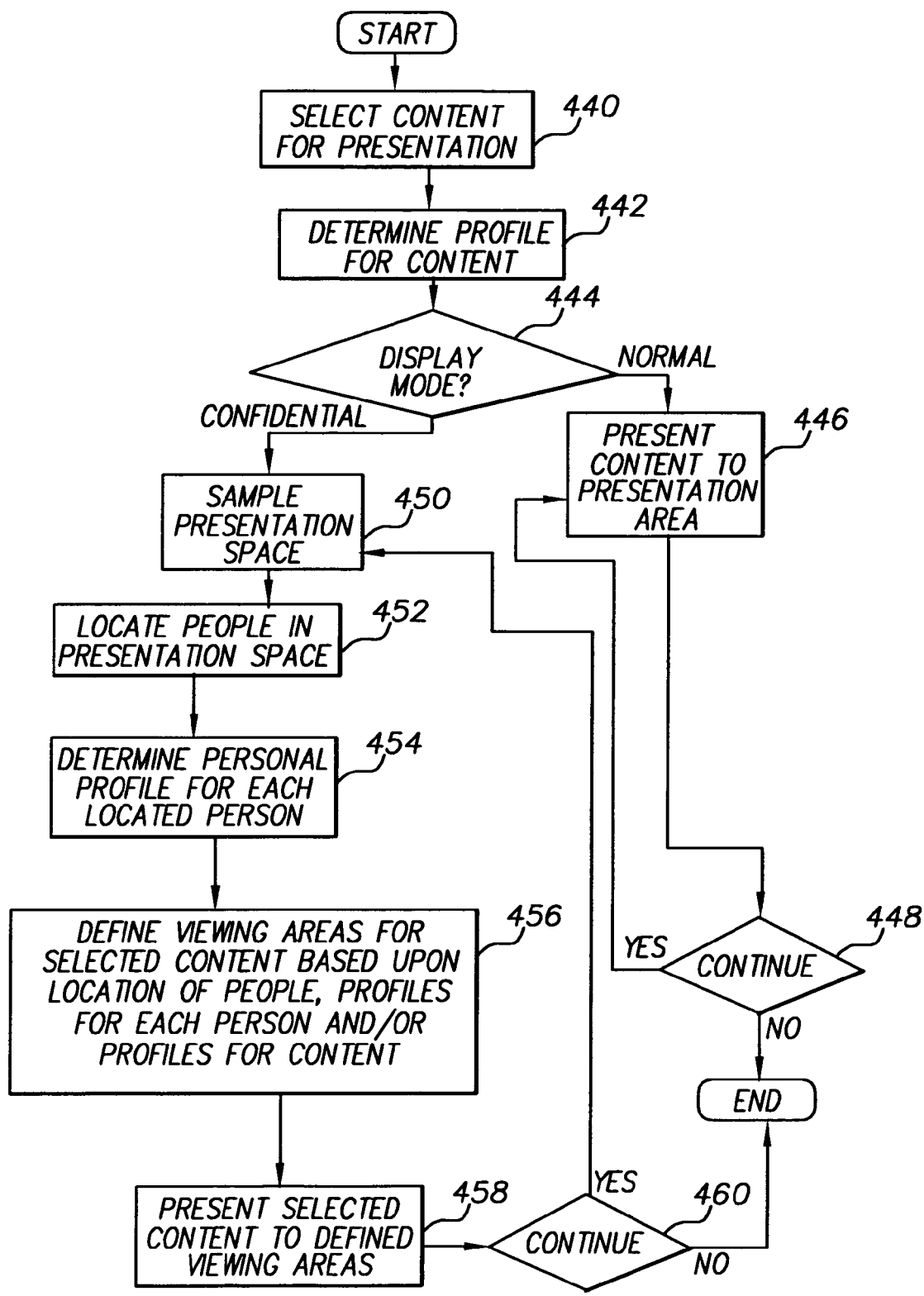
FIG. 16 is a flow diagram of another embodiment of the method of the present invention.

FIG. 16 shows another embodiment of the present invention. In this embodiment, display system 110 determines a desire to view content (step 440). Typically, this desire is indicated using user interface 338. Signal processor 332 analyzes signals bearing the selected content and determines access privileges associated with this content (step 442). The access privileges identify a condition or set of conditions that are recommended or required to view the content. For example, MPAA ratings can be used to determine access privileges. Alternatively, the access privileges can be determined by analysis of the proposed content. For example, where display system 110 is called upon to present digital information such as from a computer, the content of the information can be analyzed based upon the information contained in the content and a rating can be assigned. Access privileges for a particular content can also be manually assigned during calibration.

In still another alternative, a person in presentation space A can define certain classes of content that the person desires to define access privileges for. For example, the person can define higher levels of access privileges for private content. When the content is analyzed, scenes containing private content can be identified by analysis of the content or by analysis of the metadata associated with the content that indicates the content has private aspects. Such content can then be automatically associated with appropriate access privileges.

Controller 334 then makes display mode determination based upon the access privileges associated with the content. Where the content has a relatively low level of access privileges controller 334 can select (step 444) a "normal" display mode wherein the display system 110 is adapted to present content over substantially all of presentation space A for the duration of the presentation of the selected content (step 446).

Where a controller 334 determines the content is of a confidential or potentially confidential nature, controller 334 causes presentation space A to be sampled (step 450). In this embodiment, this sampling is performed when image capture unit 342 captures an image of presentation space A. Depending on the optical characteristics of presentation space monitoring system 340, it may be necessary to capture different images at different depths of field so that the images obtained depict the entire presentation space with sufficient focus to permit identification of people in presentation space A. Presentation space imaging system 340 generates a sampling signal based upon these images and provides this sampling signal to signal processor 332.

The sampling signal is then analyzed to detect people in presentation space A (step 452). Image analysis tools such as those described above can be used for this purpose. Profiles for each person in the image are then obtained based on this analysis (step 454).

One or more viewing areas are then defined in presentation space A based upon the location of each detected person, the profile for that person and the profile for the content (step 456). Where more than one person is identified in presentation space A, this step involves determining personal profiles for each person. There are various ways in which this can be done. The personal profiles can be combined in an additive manner with each of the personal profiles examined and content selected based upon the sum of the privileges associated with the people. Table I shows an example of this type. In this example three people are detected in the presentation space, two adults and a child. Each of these people has an assigned profile identifying viewing privileges for the content. In this example, the viewing privileges are based upon the MPAA ratings scale.

TABLE I

| Viewing Privilege Type (Based On MPAA Ratings) | Person I: Adult Profile | Person II: Child Profile | Person III: Adult Profile | Combined Privileges |
|---|---|---|---|---|
| G - General Audiences | YES | YES | YES | YES |
| PG - Parental Guidance Suggested | YES | NO | YES | YES |
| PG-13 - Parents Strongly Cautioned | YES | NO | NO | YES |

As can be seen in this example, the combined viewing privileges include all of the viewing privileges of the adult even though the child has fewer viewing privileges.

The profiles can also be combined in a subtractive manner. Where this is done profiles for each element in the presentation space are examined and the privileges for the audience are reduced for example, to the lowest level of privileges associated with one of the profiles for one of the people in the room. An example of this is shown in Table II. In this example, the presentation space includes the same adults and child described with reference to Table I.

TABLE II

| Viewing Privilege Type (Based On MPAA Ratings) | Person I: Adult Profile | Person II: Child Profile | Person III: Adult Profile | Combined Privileges |
|---|---|---|---|---|
| G - General Audiences | YES | YES | YES | YES |
| PG - Parental Guidance Suggested | YES | NO | YES | NO |
| PG-13 - Parents Strongly Cautioned | YES | NO | NO | NO |

However, when the viewing privileges are combined in a subtractive manner, the combined viewing privileges are limited to the privileges of the element having the lowest set of privileges: the child. Other arrangements can also be established. For example, profiles can be determined by analysis of content type such as violent content, mature content, financial content or personal content with each element having a viewing profile associated with each type of content. As a result of such combinations, a set of viewing privileges is defined which can then be used to make selection decisions.

A viewing area can then be defined for each person in presentation space A based upon the content profile and the profile for each person. For example, a viewing space can then be defined in a presentation space A that combines profiles in an additive fashion as described with reference to Table I and that presents content having a G, PG or PG13 rating to a viewing area that includes both adults and the child of Table I. Alternatively, where personal profiles are combined in a subtractive manner as is described with reference to Table II, one or more viewing areas will be defined within presentation space A that allows both adults to observe the content but that do not allow the child to observe content that is of a PG or PG-13 rating (step 456).

The content is then presented to the defined viewing areas (step 458) and the process repeats until it is desired to discontinue the presentation of the content (step 460). During each repetition, presentation space A is monitored and changes in composition of the people and/or things in presentation space A can be detected. Such changes can occur, for example, as people move about in presentation space A. Further, when such changes are detected the way in which the content is presented can be automatically adjusted to accommodate this change. For example, when an audience member moves from one side of the presentation space to another side of the presentation space, then presented content such as text, graphic, and video people in the display can change relationships within the display to optimize the viewing experience.

Other preference information can be incorporated into a person's profile. For example, as is noted above, pictoral display device 110 is capable of receiving system adjustments by way of user interface 338. In one embodiment, these adjustments can be entered during the calibration process (step 460) and presentation space monitoring system 340 can be adapted to determine which person has entered what adjustments and to incorporate the adjustment preferences with the profile for an image element related to that person. During operation, an element in presentation space A is determined to be associated with a particular person, signal processor 332 can use the system adjustment preferences to adjust the presented content. Where more than one person is identified in presentation space A, the system adjustment preferences can be combined and used to drive operation of display system 110.

Figure 17:
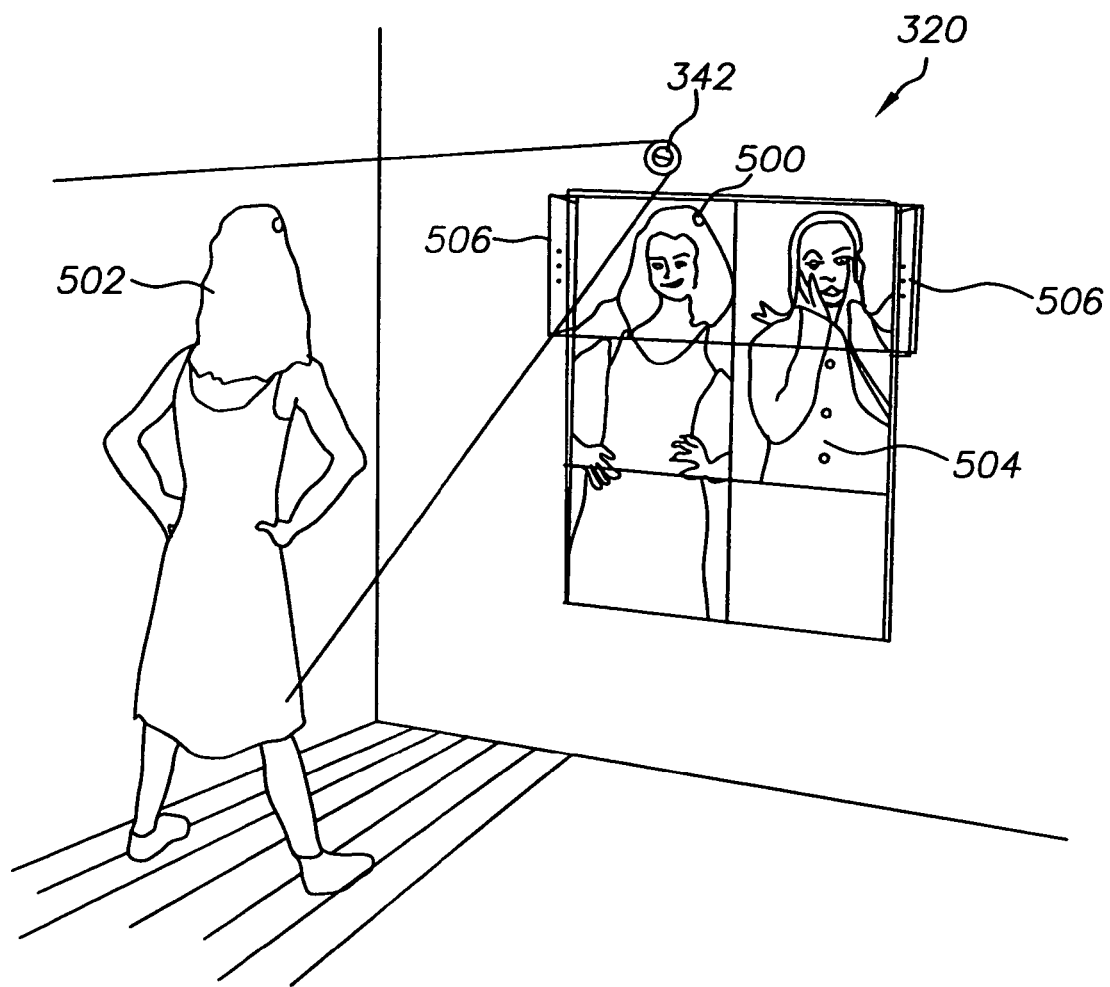
FIG. 17 is an illustration of one application of the present invention in a video-conferencing application.

As is shown in FIG. 17, display system 110 can be usefully applied for the purpose of video-conferencing. In this regard, audio system 326, user interface 338 and image capture unit 342 can be used to send and receive audio, video and other signals that can be transmitted to a compatible remote video conferencing system. In this application, display system 110 can receive signals containing content from the remote system and present video portions of this content on display device 320. As is shown in this embodiment, display device 320 provides a reflective image portion 500 showing user 502 a real reflected image or a virtual reflected image derived from images captured of presentation space A. A received content portion 504 of display device 320 shows video portions of the received content. The reflective image portion 500 and received content portion 504 can be differently sized or dynamically adjusted by user 502. Audio portions of the content are received and presented by audio system 326, which, in this embodiment includes speaker system 506.

In the above-described embodiments, the presentation space monitoring system 340 has been described as sampling presentation space A using image capture unit 342. However, presentation space monitoring system 340 can also comprise more than one image capture unit 342. Further, presentation space A can be sampled in other ways. For example, presentation space monitoring system 340 can use other sampling systems such as a conventional radio frequency sampling system 343. In one popular form, people in the presentation space are associated with unique radio frequency transponders. Radio frequency sampling system 343 comprises a transceiver that emits a polling signal to which transponders in the presentation space respond with self-identifying signals. The radio frequency sampling system 343 identifies people in presentation space A by detecting the signals. Further, radio frequency signals in presentation space A such as those typically emitted by recording devices can also be detected. Other conventional sensor systems 345 can also be used to detect people in the presentation space and/or to detect the condition of people in the presentation space A. Such detectors include switches and other transducers that can be used to determine whether a door is open or closed or window blinds are open or closed. People that are detected using such systems can be assigned with a profile during calibration in the manner described above with the profile being used to determine combined viewing privileges. Image capture unit 342, radio frequency sampling system 343 and sensor systems 345 can also be used in combination in a presentation space monitoring system 340.

Another method useful for detecting the location of and/or movement of people in the presentation space can be to employ an unmodulated ultrasonic beam of a directed audio transducer array itself as a ranging signal. FIG. 18a is a schematic diagram of a system for practicing such a method where a detector 480 mounted near the display reacts to beam of ultrasound 120 scattered back from an approaching person 490. The signal from detector 480 passes first through a narrow-bandpass ("notch") filter 482 to exclude the ultrasonic energy leaking directly to the detector from the transducer (not shown) and is then amplified by amplifier 484 and sent to a comparator 486. This system provides adjustable discrimination between any signal leaked directly to the detector from the transducer mounted on or near the display and the back scattered signal which is slightly Doppler shifted in frequency due to the motion relative to the detector of the approaching person 490. A signal from the comparator 486 is then used to turn on the audio program timer and controller 100 which provides a monitoring signal to controller 334 from which controller 334 can determine an appropriate course of action. Alternatively, as shown in FIG. 18b, the output from detector 480 is fed to differentiator 492 where a change in signal strength due to back scatter from an approaching observer is measured without any need to remove the signal from leaked energy. The signal from the differentiator 492 is amplified by amplifier 494 and sent to comparator 496 which activates audio program timer and controller 100 whenever a change in signal strength occurs.

In certain installations, it may be beneficial to monitor areas outside of presentation space A, but proximate to presentation space A to detect people such as people who may be approaching the presentation space. This permits the content on the display or audio content associated with the display to be adjusted before the presentation space A is encroached or entered such as before audio content can be detected. The use of multiple image capture units 342 may be usefully applied to this purpose as can the use of a radio frequency sampling system 343, a sensor system 345, or an ultrasonic system 478 adapted to monitor such areas.

Image modulator 370 has been described herein above as involving an array 382 of micro-lenses 384. The way in which micro-lenses 384 control the angular range, a, of viewing space 372 relative to a display can be defined using the following equations for the angular range, a, in radians over which an individual image is visible, and the total field, q, also in radians before the entire pattern repeats. They depend on the physical parameters of the lenticular sheet, p, the pitch in lenticles/inch, t, the thickness in inches, n, the refractive index, and M, the total number of views you put beneath each lenticle. The relationships are:

$$a = n/(M*p*t), \text{ and} \quad (1)$$

$$q = n/(p*t) \quad (2)$$

The refractive index, n, does not have a lot of range (1.0 in air to 1.6 or so for plastics). However, the other variables do. From these relationships it is evident that increasing one or all of M, p and t leads to narrower view (or more isolated) viewing space. Increased M means that the area of interest must be a very small portion of the width of a micro-lens 384. However, micro-lenses 384 are ideal for efficient collection and direction of such narrow lines of light. The dilemma is that increased p and t can also lead to repeats of areas in which the content can be observed. This is not ideal for defining a single isolated region for observation. One way to control the viewing space using such an array 382 of micro-lenses 384 is to define the presentation space so that the presentation space includes only one repeat.

In other embodiments, other technologies can be used for performing the same function described herein for image modulator 370. For example, optical barrier technologies can be used in the same manner as described with respect to array 382 of micro-lenses 384 to provide a controllable viewing space within a presentation space. One example of such an optical barrier technology is described in commonly assigned U.S. Pat. No. 5,828,495, entitled "Lenticular Image Displays With Extended Depth" filed by Schindler et al. on Jul. 31, 1997. Such barrier technology, avoids repeats in the viewing cycle, but can be inefficient with light.

In one embodiment of the invention, display 320 and image modulator 370 can be combined. For example, in one embodiment of this type image modulator 370 can comprise an adjustable parallax barrier that can be incorporated in a conventional display panel such as a backlit LCD display. The adjustable parallax barrier can be made switchable between a state that allows only selected portions of a back light to pass through the display. This allows control of the path of travel of the back lighting as it enters presentation space A and makes it possible to display separate images in presentation space A so that these separate images are viewable in the presentation space A. One example of an LCD panel of this type is the Sharp 2d/3d LCD display developed by Sharp Electronics Corporation, Naperville, Ill., U.S.A.

As disclosed by Sharp in a press release dated Sep. 27, 2002, this parallax barrier is used to separate light paths for light passing through the LCD so that different viewing information reaches different eyes of the viewer. This allows for images to be presented having parallax discrepancies that create the illusion of depth. The adjustable parallax barrier can be disabled completely making it transparent for presenting conventional images. It will be appreciated that this technology can be modified so that when the parallax barrier is active, the same image is presented to a limited space or spaces relative to the display and so that when the parallax barrier is deactivated, the barrier allows content to be presented by the display in a way that reaches an entire display space. It will be appreciated that such an adjustable optical barrier can be used in conjunction with other display technologies including but not limited to OLED type displays. Such an adjustable optical barrier can also be used to enhance the ability of the display to provide images that are viewable only within one or more viewing spaces.

Figure 19:
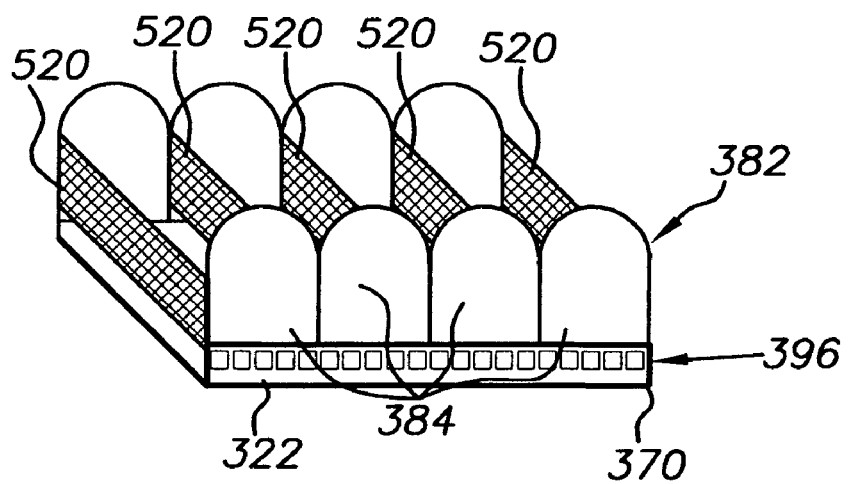
FIG. 19 shows an alternate embodiment of an image modulator.

Another embodiment is shown in FIG. 19, in this embodiment an array 382 of individual hemi-cylindrical micro-lenses 384 is provided with physical or absorbing barriers 520 between each micro-lens 384. Cylindrical lenses can also be used for this purpose. These absorbing barriers provide the advantages of both of the above approaches. The barriers eliminate repeat patterns, allowing the adjustment of pitch, p and thickness, t, to define an exclusive or private viewing region. This viewing region is further restricted by a narrowing of the beam of light (i.e. effectively, higher value of M). The lens feature eliminates the loss of light normally associated with traditional slit-opening barrier strips.

In still another embodiment of this type, a "coherent fiber optic bundle" (not shown) which provides a tubular structure of tiny columns of glass or other internally reflective material that relay an image from one plane to another without cross talk can be used to direct light along a narrow viewing range to an observer. For example such a coherent fiber optic bundle can be defined in the form of a fiber optic face plate of the type used for transferring a flat image onto a curved photomultiplier in a night vision device. Using the same concept as is illustrated in FIG. 9, micro-lenses 384 formed at the end of each fiber column would allow the direction of light toward a specific target, narrowing the observable field to a small X and Y region in space.

In the above described embodiments, each viewing area has generally been described as receiving a single channel of image content. However, in certain embodiments, two or more views can be provided to a viewing area with the views being separated to provide a stereoscopic or other depth viewing experience to a person in a viewing area using techniques known in the art, including but not limited to those described in '495 patent.

It will be appreciated that the present invention, while particularly useful for allowing multiple users of a large-scale video display system to observe different content, the present invention is also useful for other smaller systems such as video displays of the types used in video cameras, personal digital assistants, personal computers, portable televisions and the like.

The invention has been described in detail with particular reference to certain preferred embodiments thereof, but it will be understood that variations and modifications can be effected within the spirit and scope of the invention. However, the various components of the display system 110 shown in FIG. 9 can be combined, separated and/or combined with other components to provide the claimed features and functions of the present invention.

As used herein the term channel of image content can include any form of image content that can be presented by any known display device including but not limited to an image, sequence of images, video stream, stream of image information, computer rendering, textual displays, graphic displays or any observable contrast pattern.

The invention has been described in detail with particular reference to certain preferred embodiments thereof, but it will be understood that variations and modifications can be effected within the spirit and scope of the invention.

| PARTS LIST | |
|---|---|
| 10 | electrostatic transducer assembly |
| 15 | cover |
| 20 | screened end |
| 25 | diaphragm |
| 30 | backplate |
| 35 | spring |
| 40 | tongue-like end |
| 50 | directional audio transducer array |
| 55 | phased array directional audio transducer |
| 60 | audio content storage memory |
| 70 | audio preprocessing and array driver |
| 71 | audio preprocessing and phased-array driver |
| 80 | networked audio source |
| 90 | beam steering controller |
| 100 | audio program timer and controller |
| 110 | display system |
| 112 | rotatable reflector |
| 114 | motor |
| 115 | audio subsystem |
| 116 | reflector control electronics |
| 117 | audio subsystem |
| 118 | display surface |
| 119 | audio subsystem |
| 120 | beam of sound |

-continued

PARTS LIST

| | |
|---|---|
| 120a | beam of sound |
| 120b | beam of sound |
| 125 | directed beam of sound |
| 130 | viewing position |
| 130a | viewing position |
| 130b | viewing position |
| 310 | presentation system |
| 320 | display |
| 322 | source of image modulated light |
| 324 | display driver |
| 326 | audio system |
| 330 | control system |
| 332 | signal processor |
| 334 | controller |
| 336 | supply of content |
| 338 | user interface |
| 340 | presentation space monitoring system |
| 342 | image capture unit |
| 343 | radio frequency sampling system |
| 344 | taking lens unit |
| 345 | sensor system |
| 346 | image sensor |
| 348 | processor |
| 350 | person |
| 351 | wall |
| 352 | person |
| 354 | person |
| 356 | door |
| 358 | window |
| 360 | source of personal profiles |
| 370 | image modulator |
| 371 | viewing area |
| 372 | viewing area |
| 373 | viewing area |
| 374 | width of viewing space |
| 376 | depth of viewing space |
| 378 | near viewing distance |
| 380 | far viewing distance |
| 382 | array of microlenses |
| 384 | micro-lenses |
| 386 | image elements |
| 388 | optical axis |
| 390 | position |
| 392 | position |
| 394 | position |
| 396 | group width |
| 398 | range of viewing position |
| 410 | Initialize step |
| 412 | sample presentation space step |
| 414 | multi-display mode step |
| 416 | locate step |
| 418 | define viewing space step |
| 420 | present content to viewing space step |
| 422 | continue determination step |
| 424 | present content step |
| 430 | obtain calibration images step |
| 432 | record calibration information step |
| 434 | associate profile information step |
| 436 | store calibration images and information step |
| 440 | select content for presentation step |
| 442 | determine profile for content step |
| 444 | determine display mode step |
| 446 | normal display step |
| 448 | continue display step |
| 450 | sample presentation space step |
| 452 | locate people in presentation space step |
| 454 | determine personal profile step |
| 456 | define viewing space step |
| 458 | present content step |
| 460 | continue determining step |
| 480 | detector |
| 482 | narrow band pass filter |
| 484 | amplifier |
| 486 | comparator |
| 490 | approaching person |
| 492 | differentiator |
| 500 | image portion |

-continued

PARTS LIST

| | |
|---|---|
| 502 | user |
| 504 | content portion |
| 506 | speaker system |
| 520 | absorbing barrier |
| A | presentation space |
| V | group of image elements |
| V' | viewing space |
| W | group of image elements |
| W' | viewing space |
| X | group of image elements |
| X' | viewing space |
| Y | group of image elements |
| Y' | viewing space |
| Z | group of image elements |
| Z' | viewing space |

The invention claimed is:

1. A control system for a display, the control system comprising:

a presentation space monitoring system sampling a presentation space within which images presented by the display can be observed, and generating monitoring signals from which the location of people in the presentation space can be determined;

an image modulator positioned between the display and the presentation space with the image modulator adapted to control the spatial distribution of image light emitted by the display so that light that is emitted by particular portions of the display travel to particular areas in the presentation space; and a controller adapted to determine the location of each person in the presentation space based upon the monitoring signal, to determine an individual viewing area for each located person, and to obtain at least one channel of content for presentation to each person;

wherein the controller is further adapted to cause the display to present a combination image with images from each channel of content obtained for each person arranged in the form of a pattern of light that is spatially distributed by the image modulator to the viewing area determined for that person;

wherein the processor is further adapted to analyze the monitoring signals during presentation of the content to detect movement of a person during presentation of the image content and to adjust the viewing area used to present content obtained for each moving person so that the content obtained for the moving person can be viewable by the person; and wherein the controller further analyzes the monitoring signals to detect when one person moves to a location that coincides with the viewing area of at least one other person, determines content for presentation to both persons based upon privileges associated with both persons, obtains the determined content and presents the determined content so that it is observable in a common viewing space occupied by the people.

2. The control system of claim 1, wherein the controller is further adapted to determine a profile for each person in the presentation space and wherein the processor obtains content for presentation to each person based upon the profile for the person and a profile for available content.

3. The control system of claim 1, wherein the presentation space monitoring system comprises an image capture system adapted to capture an image of the presentation space and the controller detects people in the presentation space by analyzing the captured image.

4. The control system of claim 1, wherein the presentation space monitoring system comprises a radio frequency signal detection system adapted to detect signals in the presentation space and the processor detects each person in the presentation space based upon the detected radio frequency signals.

5. The control system of claim 1, wherein the profile for each person comprises viewing privileges and the content profile contains access privileges and wherein the processor combines the viewing privileges in an additive manner and selects content for presentation based upon the combined viewing privileges and the access privileges.

6. The control system of claim 1, wherein the profile for each person comprises viewing privileges and the content profile contains access privileges and wherein the processor combines the viewing privileges in a subtractive manner and selects content for presentation based upon the combined viewing privileges and the access privileges.

7. A display system comprising:
a display capable of presenting separate channels of image content to separable viewing areas;
a multi-channel source of changing pictorial content;
a source of audio content providing audio signals containing audio content associated with each of channel of changing pictorial content;
an audio transducer to convert audio content into audible signals;
an acoustic driver adapted to direct selected audible signals to selected viewing areas;
a monitoring system adapted to monitor areas in which pictorial content can be viewed to locate people in the monitored areas;
a controller connected to multi-view display, the source of changing pictorial content, the source of audio content, the audio transducer and the acoustic driver,
the controller adapted to cause the multi-view display to display separate channels of pictorial content in separate viewing areas each defined proximate to a person located by the monitoring system and to cause the audio transducer and acoustic driver to separately direct audio content associated with each channel of the changing pictorial content presented in each viewing area to that viewing area;
wherein the monitoring system determines an identifier for each detected person and wherein the controller is further adapted to determine a personal profile for each detected person, to determine a profile for each channel of content and to define a channel of content and associated audio content for presentation to each person based upon the personal profile and the profiles for each channel of content.

8. A display system comprising:
a display capable of presenting separate channels of image content to separable viewing areas;
a multi-channel source of changing pictorial content;
a source of audio content providing audio signals containing audio content associated with each of channel of changing pictorial content;
an audio transducer to convert audio content into audible signals;
an acoustic driver adapted to direct selected audible signals to selected viewing areas;
a monitoring system adapted to monitor areas in which pictorial content can be viewed to locate people in the monitored areas;
a controller connected to the multi-view display, the source of changing pictorial content, the source of audio content, the audio transducer and the acoustic driver,
the controller adapted to cause the multi-view display to display separate channels of pictorial content in separate viewing areas each defined proximate to a person located by the monitoring system and to cause the audio transducer and acoustic driver to separately direct audio content associated with each channel of the changing pictorial content presented in each viewing area to that viewing area;
wherein the acoustic driver comprises a phased-array directional audio transducer with associated driver and audio preprocessing and phased-array driver and a phased-array transducer beam steering controller, the beam steering controller connected to the audio preprocessing and phased-array driver and wherein the phased-array directional audio transducer is arranged to direct a beam of sound to a specific viewing position corresponding to a particular view.

9. A method for presenting multiple channels of image content using a light emitting display, the method comprising the steps of:
detecting people in a presentation space within which content presented by the display can be observed;
defining a viewing area for each person with each viewing area comprising less than all of the presentation space and including area corresponding to each person;
obtaining one channel of image content for presentation to each person;
presenting a combination image on the display; and
modulating the presented combination image so that each area of the combination image presented by the display is viewable only in selected areas of the presentation space;
wherein the combination image has image content from each channel arranged in areas of said combination image so that, when modulated, the image content from each channel of image content is viewable only in the viewing area defined for the person for whom the content is obtained; and
wherein the display space is monitored during presentation of the content to detect whether more than one person enters a common viewing space, combining the profiles of each person in the common viewing space and obtaining content for presentation in the common viewing space based upon the combined profiles of the viewers and a profile for each channel of content.

10. The method of claim 9, further comprising the step of classifying each detected person and wherein the step of obtaining a channel of content for presentation to each person comprises obtaining a channel of content that is selected based upon the classification for that person.

11. The method of claim 9, further comprising the steps of obtaining a channel of audio content that corresponds each channel of image content, forming an audible signal and modulating the audible signal so that it is audible only in a viewing area that corresponds to a presentation space in which the corresponding image content is presented.

12. The method of claim 9, wherein the step of obtaining content for presentation to each person comprises obtaining a profile for each detected person and for each channel of image content and selecting image content for presentation where the profiles for the detected elements correspond to the content profile.

13. The method of claim 9, wherein the step of detecting people in the presentation space comprises capturing an image of the presentation space and analyzing the image to detect the people.

14. The method of claim 9, further comprising the steps of detecting movement of a person during presentation of the image content and adjusting the viewing area used to present content obtained for each moving person so that the content obtained for a person can be viewable by the person even where the person moves outside of a viewing area initially defined.

15. The method of claim 9, further comprising the step of analyzing the monitoring signal to detect when one person moves to a location that coincides with the viewing area of another person, determining content for presentation to both persons based upon viewing privileges associated profiles with both people, obtaining the determined content and presenting the determined content so that it is observable in a common viewing space occupied by the persons.

16. The method of claim 9, wherein the step of detecting people in the presentation space comprises using ultrasonic beam to scan the presentation space and to locate people in the presentation space using ultrasonic carrier.

17. The method of claim 9, wherein the step of modulating the audible signal so that is audible only in a viewing area that corresponds to a presentation space in which the corresponding image is presented comprises modulating the audible signal using an ultrasonic carrier and wherein the step of detecting people in the presentation space comprises using the ultrasonic carrier to scan the presentation space and to locate people in the presentation space.

18. The method of claim 9, further comprising the steps of detecting a person approaching the presentation space and determining a profile for each person approaching the presentation space and adjusting the presentation of content based upon the determined profile for the approaching person.

19. A method for presenting multiple channels of image content using a light emitting display, the method comprising the steps of:

detecting people in a presentation space within which content presented by the display can be observed;

selecting different channels of content for the detected people;

defining a separate viewing area for each detected person with each viewing area comprising less than all of the presentation space and including space corresponding to a detected person; and forming an image that comprises a combination of the image content from each different channel of content with the combination image incorporating image content from different channels in different areas of the combination image;

presenting the combination image in the form of a pattern of image modulated light; and directing the image modulated light so that light from different portions of the display is directed toward different areas of the presentation space;

wherein the combination image contains image information from each channel of content arranged so that image modulated light formed based upon the content selected for each person will be directed to the viewing area defined for that person; and further comprising the steps of detecting when one person moves to a location that coincides with the viewing area of at least one other person, determining content for presentation to both persons based upon privileges associated with both persons, obtaining the determined content and presenting the determined content so that it is observable in a common viewing space occupied by the people.

20. The method of claim 19, wherein light is directed toward different areas of the presentation space by passing the light through an array of microlenses.

21. The method of claim 20, further comprising the steps of:

obtaining an audio signal for at least one of the channels of image content; and generating an audible output based upon each obtained audio signal, said output being audible only in a viewing area in which the content is presented.

* * * * *